US006837996B2

(12) United States Patent
Kurth et al.

(10) Patent No.: US 6,837,996 B2
(45) Date of Patent: Jan. 4, 2005

(54) POLYSULFONAMIDE MATRICES

(75) Inventors: Christopher J. Kurth, St. Louis Park, MN (US); Steven D. Kloos, Chanhassen, MN (US); Jessica A. Peschl, Minneapolis, MN (US); Leonard T. Hodgins, Closter, NJ (US)

(73) Assignee: GE Osmonics, Inc., Minnetonka, MN (US)

( * ) Notice: Subject to any disclaimer, the term of this patent is extended or adjusted under 35 U.S.C. 154(b) by 148 days.

(21) Appl. No.: 10/302,758

(22) Filed: Nov. 22, 2002

(65) Prior Publication Data

US 2003/0141242 A1 Jul. 31, 2003

Related U.S. Application Data

(63) Continuation of application No. PCT/US01/16897, filed on May 23, 2001
(60) Provisional application No. 60/206,494, filed on May 23, 2000, and provisional application No. 60/206,276, filed on May 23, 2000.

(51) Int. Cl.$^7$ .............................................. B01D 71/76
(52) U.S. Cl. ............... 210/500.38; 210/483; 210/488; 210/490; 210/500.41; 210/504; 210/506; 210/507
(58) Field of Search ............................. 210/483, 488, 210/489, 490, 500.38, 500.41, 504, 506, 507

(56) References Cited

U.S. PATENT DOCUMENTS

| | | | |
|---|---|---|---|
| 856,310 A | 6/1907 | Stone | |
| 873,606 A | 12/1907 | Rhoades | |
| 875,067 A | 12/1907 | Green | |
| 875,070 A | 12/1907 | Haas et al. | |
| 875,072 A | 12/1907 | Harbach | |
| 2,808,394 A | 10/1957 | Speck | 260/79.3 |
| 2,853,475 A | 9/1958 | Murphey | 260/79.3 |
| 2,875,183 A | 2/1959 | Murphey | 260/79.3 |
| 3,744,642 A | 7/1973 | Scala et al. | |
| 3,914,358 A | 10/1975 | Dixon et al. | 264/41 |
| 3,951,815 A | 4/1976 | Wrasidlo | 210/500 M |
| 3,988,883 A | 11/1976 | Sze | 57/245 |
| 4,039,440 A | 8/1977 | Cadotte | 210/23 H |
| 4,080,483 A | 3/1978 | Kray | 428/290 |
| 4,107,155 A | 8/1978 | Fletcher et al. | 528/373 |
| 4,242,208 A | 12/1980 | Kawaguchi et al. | 210/500.2 |
| 4,251,387 A | 2/1981 | Lim et al. | 252/316 |
| 4,265,745 A | 5/1981 | Kawaguchi et al. | 210/654 |
| 4,277,344 A | 7/1981 | Cadotte | 210/654 |
| 4,302,336 A | 11/1981 | Kawaguchi et al. | 210/654 |
| 4,360,434 A | 11/1982 | Kawaguchi et al. | 210/500.2 |
| 4,388,189 A | 6/1983 | Kawaguchi et al. | 210/490 |
| 4,619,767 A | 10/1986 | Kamiyama et al. | 210/490 |
| 4,758,343 A | 7/1988 | Sasaki et al. | 210/500.38 |
| 4,761,234 A | 8/1988 | Uemura et al. | 210/500.38 |
| 4,765,897 A | 8/1988 | Cadotte et al. | 210/500.23 |
| 4,857,363 A | 8/1989 | Sasaki et al. | 427/245 |
| 4,872,984 A | 10/1989 | Tomaschke | 210/500.38 |
| 4,948,507 A | 8/1990 | Tomaschke | 210/500.38 |
| 4,950,404 A | 8/1990 | Chau | 210/500.27 |
| 4,983,291 A | 1/1991 | Chau et al. | 210/490 |
| 5,051,178 A | 9/1991 | Uemura et al. | 210/500.38 |
| 5,085,777 A | 2/1992 | Arthur | 210/500.38 |
| 5,234,598 A | 8/1993 | Tran et al. | 210/654 |
| 5,258,203 A | 11/1993 | Arthur | 427/245 |
| 5,262,054 A | 11/1993 | Wheeler | 210/639 |
| 5,271,843 A | 12/1993 | Chau et al. | 210/654 |
| 5,358,745 A | 10/1994 | Tran et al. | 427/333 |
| 5,576,057 A | 11/1996 | Hirose et al. | 427/245 |
| 5,614,099 A | 3/1997 | Hirose et al. | 210/653 |
| 5,627,217 A | 5/1997 | Rilling et al. | 521/50 |
| 5,658,460 A | 8/1997 | Cadotte et al. | 210/500.38 |
| 5,674,398 A | 10/1997 | Hirose et al. | 210/500.38 |
| 5,693,227 A | 12/1997 | Costa | 210/650 |
| 5,733,602 A | 3/1998 | Hirose et al. | 427/245 |
| 5,744,039 A | 4/1998 | Itoh et al. | 210/644 |
| 5,811,387 A | 9/1998 | Simon et al. | 514/2 |
| 5,843,351 A | 12/1998 | Hirose et al. | 264/45.1 |
| 5,945,000 A | 8/1999 | Skidmore et al. | 210/650 |
| 6,024,873 A | 2/2000 | Hirose et al. | 210/500.38 |
| 6,103,865 A | 8/2000 | Bae et al. | 528/373 |

FOREIGN PATENT DOCUMENTS

| | | | |
|---|---|---|---|
| EP | 0 382 439 | 8/1990 | C08J/5/22 |
| EP | 0505502 | 9/1993 | B01D/69/12 |
| EP | 0787525 | 8/1997 | B01D/69/12 |
| EP | 0992277 | 4/2000 | B01D/69/12 |
| EP | 1020218 | 7/2000 | B01D/71/56 |
| EP | 0718029 | 4/2003 | B01D/67/00 |
| GB | 875069 | 8/1961 | D01F/7/76 |
| GB | 875072 | 8/1961 | |
| JP | 63-012310 | 1/1988 | B01D/13/04 |

OTHER PUBLICATIONS

Cadotte, J. E., et al., "Advanced Poly(Piperazineamide) Reverse Osmosis Membranes", *Office of Water Research and Technology Report, U.S. Department of the Interior PB80–127574*, Contract No. 14–34–0001–8512,(1979).

Dickson, J. M., et al., "Development of a Coating Technique for the Internal Structure of Polypropylene Microfiltration Membranes", *Journal of Membrane Science, 148*, (1998), 25–36.

(List continued on next page.)

*Primary Examiner*—John Kim
(74) *Attorney, Agent, or Firm*—Schwegman, Lundberg, Woessner & Kluth, P.A.

(57) ABSTRACT

Sulfonamide polymer matrices and their various uses are disclosed. Among the uses is the configuration of the matrix with a porous support membrane to form a semipermeable membrane of the invention. The matrix of the invention is ultrathin, dense and substantially free of defects. The matrix configuration as the semipermeable membrane shows improved permeate flux and retention values.

22 Claims, No Drawings

OTHER PUBLICATIONS

Evers, Robert C., et al., "Notes: Preparation and Thermal Properties of Some Piperazine Polysulfonamides", *Journal of Polymer Science Part A–1, 5*. (1967),1797–1801.

Imai, Yoshio, et al., "Synthesis of Polysulfonamides from Aromatic Disulfonyl Bromides and Diamines", *Journal of Polymer Science, Polymer Chemistry Ed.*, 17, (1979),2929–2933

Ji, J., "Fabrication of Thin–Film Composite Membranes with Pendant, Photoreactive Diazoketone Functionality", *Journal of Applied Polymer Science*, 64, (1997),2381–2398.

Ji, J., et al., "Mathematical Model for the Formation of Thin–Film Composite Membranes by Interfacial Polymerization: Porous and Dense Films", Macromolecules, 33, (2000),624–633.

Jiang, Ji M., "Fabrication and Photochemical Surface Modification of Photoreactive Thin–Film Composite Membranes and Model Development For Thin Film Formation by Interfacial Polymerization", *McMaster University*, UMI Dissertation Services,(1996), Morgan, Paul, "VII. Polysulfonamides and Polyphosphonamides", *In: Condensation Polymers*, Interscience Publishers: New York City,(1965),304–324.

Stake, A. M., et al., "Preparation of Reverse–Osmosis Membranes by Surface Modification of Polymeric Films", *In: NTIS U.S. Department of Commerce Report PB208790*, Contract No. 14–30–2750, Progress Report No. 768,(Apr. 1972).

Sundet, S. A., et al., "Interfacial Polycondensation. IX. Polysulfonamides",*Journal of Polymer Science, XL*, (1959), 389–397.

Trushinski, B. J., et al., "Photochemically Modified Thin-Film Composite Membranes. II. Bromoethyl Ester, Dioxolan, and Hydroxyethyl Ester Membranes", *Journal of Applied Polymer Science, 54*, (1994),1233–1242.

Trushinski, B. J., et al., "Photochemically Modified Thin-Film Composite Membranes. I. Acid and Ester Membranes", *Journal of Applied Polymer Science*, 48, (1993),187–198.

Trushinski, B. J., "Polysulfonanide Thin–Film Composite Reverse Osmosis Membranes", *Journal of Membrane Science, 143*, (1998),181–188.

Chan, Wing–Hong, et al., "Water–alcohol separation by pervaporation through chemically modified poly(amidesulfonamide)s", *Journal of Membrane Science*, vol. 160, (1999), pp. 77–86.

POLYSULFONAMIDE MATRICES

RELATED APPLICATIONS

This application is a continuation under 35 U.S.C. 111 (a) of International Application No. PCT/US01/16897 filed May 23, 2001 and published as WO 01/91873 A2 on Dec. 6, 2002, which claims priority from U.S. Provisional Application No. 60/206,494, filed May 23, 2000, and from U.S. Provisional Application No. 60/206,276, filed May 23, 2000, which applications and publication are incorporated herein by reference.

BACKGROUND OF THE INVENTION

Semipermeable membranes play an important part in industrial processing technology and other commercial and consumer applications. Examples of their applications include, among others, biosensors, transport membranes, drug delivery systems, water purification devices, supported catalysts, including supported enzyme catalysts, and selective separation systems for aqueous and organic liquids carrying dissolved or suspended components.

Generally, semipermeable membranes operate as separation devices by allowing certain components of a liquid solution or dispersion of solvent and one or more solutes to permeate through the membrane while retaining other components in the solution or dispersion. The components that permeate or are transmitted through the membrane are usually termed permeate. These components may include the solution or dispersion solvent alone or in combination with one or more of the solution or dispersion solutes. The components retained by the membrane are usually termed retentate. These components may include either or both of the solution or dispersion solvent and one or more of the solution or dispersion solutes. Either or both of the permeate and retentate may provide desired product.

The industry has, for convenience, categorized these semipermeable membranes as microfiltration, ultrafiltration, nanofiltration or reverse osmosis membranes. These categories do not have rigid definitions. Most definitions available in the industry arrange the membranes according to properties and function. For example, the microfiltration and ultrafiltration membranes are often defined by their pore sizes. Typically, these membranes contain recognizable pores of sizes from 0.1 to 10 microns and 1 nm to 0.1 micron respectively. Nanofiltration (NF) and reverse osmosis (RO) membranes, in contrast, are most often regarded as not containing recognizable pores. Instead, NF and RO membranes are believed to transmit liquid permeate through void spaces in the molecular arrangement of the material making the membrane barrier layer. NF membranes typically are used, for example, to fractionate monovalent ions from divalent ions or to fractionate small organic compounds from other small organic compounds (monosaccharides from disaccharides, for example) or salts from organic compounds. RO membranes generally retain all components other than the permeating liquids such as water, with certain exceptions such as weakly ionizing HF, which tends to permeate with water through RO membranes. Under certain circumstances, the RO membranes can also be used to separate and/or fractionate small organic molecules.

RO membranes are often found in industrial applications calling for concentration of mixtures of inorganic salts, or concentration of mixtures of small, very similar organic molecules. RO membranes are used foremost for desalination either of municipal or well water or of seawater. These membranes are also typically used in recovery operations such as mining, spent liquor recovery from industrial processing and general industrial applications. The RO membranes function by retaining the solution solute, such as dissolved salts or molecules, and allowing the solution solvent, such as water, to permeate through the membrane. Commercial RO systems typically retain greater than 99% of most ions dissolved in a solvent such as water.

In contrast, NF membranes are often found in industrial applications calling for separation of one small compound from another. For example, NF membranes are used foremost for separation of alkaline salts from alkaline earth salts such as separation of mixtures of sodium and magnesium chlorides. Some NF membranes function by retaining the double charged ions while allowing the singly charged ions (with their corresponding anions) to permeate with the solvent.

RO and NF membranes are typically characterized by two parameters: permeate flux and retention ability. The flux parameter indicates the rate of permeate flow per unit area of membrane. The retention ability indicates the ability of the membrane to retain a percentage of a certain component dissolved in the solvent while transmitting the remainder of that component with the solvent. The retention ability is usually determined according to a standard retention condition.

RO and NF membranes are typically operated with an appropriate pressure gradient in order to perform the desired separations. When functioning to separate, the filtration process using a RO or NF membrane overcomes the osmotic pressure resulting from the differential concentration of salts on the opposing sides of the membrane. Under an unpressurized situation osmotic pressure would cause solvent on the side with the lower salt concentration to permeate to the side having the higher salt concentration. Hence, pressure must be applied to the solution being separated in order to overcome this osmotic pressure, and to cause a reasonable flux of solvent permeate. RO membranes typically exhibit satisfactory flow rates, or fluxes, at reasonable pressures. Currently, typical commercial RO systems have fluxes on the order of 15 to 50 lmh (liters per $m^2$ per hour) at about 7 to 30 atmospheres pressure, depending on the application. Home RO systems typically run at lower pressures (1–6 atmospheres depending on line pressure) and lower fluxes (5 to 35 lmh). Seawater desalination typically runs at higher pressures (40 atm to 80 atm) and fluxes in the range of 10 lmh to 30 lmh. RO membranes also have advantageous salt retention characteristics. For example, to purify seawater, an RO membrane will typically have a salt retention value of at least 98.5 percent and preferably 99 percent or more, such that the total ion retention ability for commercial RO treatment of seawater typically will be in excess of 99.5%.

The majority of semipermeable membranes functioning as RO and NF membranes are cellulose acetate and polycarboxamide (hereinafter polyamide) membranes as well as sulfonated polysulfone and other membranes for NF alone. Polyamide membranes often are constructed as composite membranes having the thin polyamide film formed as a coating or layer on top of a supporting polysulfone microporous membrane. Typically, the RO or NF membrane is formed by interfacial polymerization or by phase inversion deposition. For example, U.S. Pat. No. 3,744,642 to Scala discloses an interfacial membrane process for preparation of an RO or NF membrane. Additional U.S. patents disclosing polyamide and polysulfonamide membranes include U.S. Pat. Nos. 4,277,344; 4,761,234; 4,765,897; 4,950,404; 4,983,291; 5,658,460; 5,627,217; and 5,693,227.

Several characteristics are described in these and other U.S. patents pertaining to semipermeable membranes as factors for advantageous operation of RO and NF membranes. These characteristics include high durability, resistance to compression, resistance to degradation by extremes of pH or temperature, resistance to microbial attack, and stability toward potentially corrosive or oxidative constituents in feed water such as chlorine. Although the polyamide membranes typified by U.S. Pat. No. 4,277,344 are widely used, especially in desalination operations to purify water, these membranes are susceptible to corrosive attack, as well as low pH and temperature degradation. Furthermore, microbial fouling of the membrane can cause loss of flux and/or retention characteristics. Nevertheless, current polyamide membranes substantially reach the goals of minimal thickness and substantial freedom from flaws or imperfections, allowing for widespread commercial use.

These two goals of minimal thickness and freedom from flaws, however, are not altogether compatible. As the thickness of the polymeric film or membrane decreases, the probability of defect holes or void spaces in the film structure increases significantly. The defect holes or void spaces result in significant loss of solute retention.

Polysulfonamide membranes provide several possible advantages over polyamide membranes. Although polysulfonamide membranes have been reported, they have no appreciable commercial application. Generally they have poor flux rates and low solute retention capabilities. For example, B. J. Trushinski, J. M. Dickson, R. F. Childs, and B. E. McCarry have described investigations of polysulfonamide membranes and their modifications in the course of attempts to achieve higher flux and better retention abilities. Trushunski, Dickson, Childs, and McCarry report these attempts in the Journal of Membrane Science 143, 181 (1998); Journal of Applied Polymer Science, 48, 187 (1993); Journal of Applied Polymer Science, 54, 1233 (1994); and Journal of Applied Polymer Science, 64, 2381 (1997). Trushunski, Dickson, Childs, and McCarry however, have been unable to achieve the functional properties of the polyamide membranes using polysulfonamides. Those functional properties are believed to enable at least in part the achievement of the typical performance thresholds qualifying a membrane for practical use.

Therefore there is a need for polysulfonamide membranes that display flux and retention capabilities like those of the polyamide membranes. In addition, there is a need to develop semipermeable membranes such as RO and NF membranes that are stable to strong acid conditions and/or stable to oxidative conditions. There is a further need to develop semipermeable membranes that will be useful in heavy, corrosive industrial applications including mineral mining, industrial desalination, industrial waste purification, industrial and residential recycling and solute recovery.

SUMMARY OF THE INVENTION

These needs are met by the present invention, which provides a sulfonamide polymer matrix, which, when configured as a semipermeable membrane, exhibits improved flux, improved retention properties, and/or improved stability. The invention also provides a process for preparing a sulfonamide polymer matrix of the invention.

More specifically, the present invention is directed to the following developments:

1. a sulfonamide polymer matrix;
2. a membrane including such a matrix;
3. a composite membrane including such a matrix;
4. an article including a combination of the sulfonamide polymer matrix and a support material;
5. a process for preparing the sulfonamide polymer matrix;
6. a process for preparing a membrane or a composite membrane of the invention
7. a polysulfonamide matrix, membrane, or composite membrane made according to the process of the invention;
8. a polysulfonamide matrix formed of a polymeric reaction product of a compound having at least two reactive sulfonyl groups and an amine compound having at least two reactive primary amine groups and at least one secondary or tertiary amine group;
9. use of a polysulfonamide membrane of the invention to separate components of a fluid mixture;
10. a process for separation of such fluid mixtures;
11. a polysulfonamide membrane that is stable under low pH conditions or corrosive or oxidative conditions;
12. an apparatus or device including the matrix or the membrane; and
13. use of the sulfonamide matrix as a coating.

The sulfonamide polymer matrix is composed of sulfonyl compound residues having at least two sulfonyl moieties and amine compound residues having at least two amine moieties wherein the sulfonyl and amine moieties form at least some sulfonamide groups ($-SO_2-N(R)-$). Preferably the amine compound residue having at least two amine moieties is not polyethyleneimine having a molecular weight of greater than or equal to 600 daltons. More preferably, the amine compound residue having at least two amine moieties is not polyethyleneimine having a molecular weight of greater than or equal to 500 daltons. Even more preferably, the amine compound residue having at least two amine moieties is not polyethyleneimine having a molecular weight of greater than or equal to 400 daltons.

The sulfonamide polymer contains at least some sulfonamide linkages in the backbone of the polymer molecules (polymer-$SO_2$—N(R)-polymer). Other functional and/or nonfunctional linkages (i.e. optional linkages) such as amide, ester, ether, amine, urethane, urea, sulfone, carbonate, and carbon-carbon sigma bonds derived from olefins may also optionally be present in the backbone. The preferable backbone linkages are sulfonamide linkages, optionally also containing amide, amine, carbon-carbon, ether and/or sulfone linkages. Especially preferably, a sulfonamide linkage backbone with one or more of the optional linkages is stable to low pH conditions. Also, the amount of optional linkages is preferably no more than about 50 percent, 30 percent, or 10 percent, and more preferably, no more than about 5 percent of the number of sulfonamide linkages present in the sulfonamide polymer backbone.

Preferably, the sulfonamide matrix may be at least partially cross-linked. Preferably, the cross-linking is achieved though inclusion of at least some of the sulfonyl compound residue and/or the amine compound residue as residues having three or more groups. Preferably, the sulfonyl compound residues include some portion of compound with at least three sulfonyl groups and/or amine groups so that polymer chains are cross-linked. Preferably, the sulfonamide polymer of the matrix is an interfacial polymer. In further preferred embodiment of the sulfonamide matrix, the matrix is free of polymer derived from an aqueous latex of sulfonamide polymer. Additionally, the matrix is preferably free of sulfonamide polymer derived from a polyalkylamine (e.g. polyethyleneamine). In another preferred embodiment, the invention provides a matrix wherein the polymer on one side of the matrix contains at least some sulfonic acid groups, and/or the polymer on the opposite side or on one side of the matrix contains at least some amine groups.

The polymer matrix according to the invention is preferably formed at least in part from compound residues derived from a sulfonyl compound having any organic nucleus and at least two activated sulfonyl groups. The sulfonyl compound may be a polymer, monomer, an oligomer, a complex molecule or other organic moiety having at least two activated sulfonyl groups. Preferably, this sulfonyl compound has Formula I:

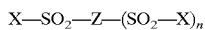

X—SO$_2$—Z—(SO$_2$—X)$_n$    I wherein Z may be any organic nucleus that does not react with activated sulfonyl groups or with primary amine groups and X is any leaving group appropriate for creation of activated sulfonyl groups. An activated sulfonyl group is a sulfonyl group that will react with a primary or secondary amine group to produce a sulfonamide group. Preferably, Z is an organic nucleus of 1 to about 30 carbon atoms, which optionally may contain oxygen, sulfur and/or nitrogen atoms as substituents or within the nucleus structure itself. The organic nucleus preferably may be aliphatic (i.e., linear or branched alkyl or alkenyl or alkynyl), cycloaliphatic, aryl, arylalkyl, heteroaliphatic, heterocycloaliphatic, heteroaryl or heteroarylalkyl wherein the hetero nucleus contains one or more oxygens, sulfurs or nitrogens. The organic nucleus may be unsubstituted or substituted wherein the substituents are polar, ionic or hydrophobic in nature. Such substituents may include but are not limited to halogen, nitrile, alkyl, alkoxy, amide, ester, ether, amine, urethane, urea, carbonate and/or thioether groups optionally substituted with aliphatic groups of 1 to 6 carbons. Such substituents may also include but are not limited to halogen, carboxylic acid, sulfonic acid, phosphoric acid, and/or aliphatic groups of 1 to 12 carbons, the latter aliphatic groups optionally being substituted by halogens. The term "n" may be an integer of from 1 to 3. X may be halogen, azide, a mixed sulfonoxy group (forming an activated sulfonyl anhydride) or the like.

The polymer matrix of the invention preferably may also be formed from amine compound residues derived from an amine compound having any organic nucleus and at least two primary and/or secondary amine groups. The amine compound may be a polymer, monomer, an oligomer, a complex molecule or any organic moiety having at least two primary and/or secondary amine groups. Preferably, the amine compound has Formula II:

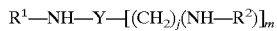

R$^1$—NH—Y—[(CH$_2$)$_j$(NH—R$^2$)]$_m$    II wherein R$^1$ and R$^2$ are independently hydrogen or aliphatic groups of 1 to 30 carbons, Y is any appropriate organic nucleus, preferably of 1 to 30 carbons, and optionally containing one or more oxygen, sulfur or nitrogen atoms. Preferably, Y is an aliphatic, aryl or arylalkyl group of 1 to 30 carbons or is a corresponding heteroaliphatic, heteroaryl or heteroarylalkyl group containing 1 or more oxygen, sulfur or nitrogen atom. The letter m is an integer from 1 to 3 and j is zero or an integer of from 1 to about 10.

An especially preferred sulfonamide polymer matrix of the invention is formed from one or more combinations of the following compound residues: naphthalene disulfonyl residues of any substitution pattern, naphthalene trisulfonyl residues of any substitution pattern, benzene disulfonyl residues of any substitution pattern, benzene trisulfonyl residues of any substitution pattern, pyridine disulfonyl residues of any substitution pattern, alpha, omega diaminoalkanes of 1 to 10 carbons, ethylene diamine, triethylenetetramine, tetraethylene pentamine, tris(2-aminoethyl)methane and tris-(2-aminoethyl)amine, meta-xylene diamine, 2-hydroxy-1,3-diaminopropane. As a second development, the invention includes a polysulfonamide membrane. The invention also includes a composite membrane including a sulfonamide polymer matrix of the invention located on at least one side of a porous or microporous support material. The porous support material may be composed of any suitable porous material including but not limited paper, modified cellulose, interwoven glass fibers, porous or woven sheets of polymeric fibers and other porous support materials made of polysulfone, polyethersulfone, polyacrylonitrile, cellulose ester, polyolefin, polyester, polyurethane, polyamide, polycarbonate, polyether, and polyarylether ketones including such examples as polypropylene, polybenzene sulfone, polyvinylchloride, and polyvinylidenefluoride. Ceramics, including ceramic membranes, glass and metals in porous configurations are also included. The support material typically contains pores have sizes ranging from about 0.001 microns to about 1 micron. The composite membrane may be formed as sheets, hollow tubes, thin films, or flat or spiral membrane filtration devices. The support thickness dimension ranges from about 1 micron to approximately 500 microns (preferably, about 1 micron to approximately 250 microns), with the upper boundary being defined by practical limitations.

The polysulfonamide membrane of the invention has an independent A value and independent retention value that enables it to operate in a practical setting. Its A value and retention value bring the composite membrane within the ranges achieved by polyamide membranes. Either as an RO or an NF membrane, the polysulfonamide composite membrane of the present invention preferably has an water permeability A value of at least 2 or 3 when the A value is the sole parameter being used to describe the membrane. When used as an RO membrane, the polysulfonamide composite membrane of the present invention preferably has an NaCl retention value of at least 98 percent when the retention value is the sole parameter being used to describe the membrane. In combinations of A value and retention value, the polysulfonamide composite membrane of the present invention has an A value from at least about 1 to at least about 20 and a corresponding NaCl retention of at least about 99 percent down to about 10 percent.

When used as an NF membrane to retain magnesium sulfate and pass sodium chloride, the retention values regarding separate magnesium sulfate and sodium chloride salts challenges ranges from at least about 90 to at least about 95 percent retention of magnesium sulfate with at least 50 to at least about 75 percent transmission of sodium chloride. For separate magnesium sulfate and magnesium chloride tests, the retention/transmission values are at least about 90 to at least about 95 percent and at least about 30 to at least about 60 percent respectively. For separate sodium sulfate and magnesium chloride tests, the retention/transmission values range from at least about 90 to at least about 95 percent and at least about 30 percent to at least about 60 percent respectively. For separate sodium sulfate, sodium chloride tests, the retention/transmission values are at least about 90 to at least about 95 percent and at least about 50 to at least about 75 percent respectively.

As a third development, the invention includes a combination of the matrix layered or coated upon the surface of any substrate including but not limited to a porous bead, a chromatographic material, metal surfaces, a microdevice, a medical device, a catheter, a CD coating, a semiconductor wafer, digital imaging printing media, a photoresist layer and the like.

As a fourth development, the invention includes a process for preparing the sulfonamide polymer matrix. The process includes the step of contacting a first phase including an amine compound having at least two amine groups which are capable of forming sulfonamide bonds, with a second phase including a sulfonyl compound having at least two sulfonyl groups which are capable of forming sulfonamide bonds.

The first and second phases may be miscible or immiscible in each other. If miscible, the two phases may mix at least to some extent, and preferably to a significant extent upon contact. If immiscible, the two phases may mix at least to some extent or may not mix at all. Preferably these phases are at least substantially immiscible in each other, and especially preferably nearly completely immiscible in each other.

The first and second phases may be neat starting materials or they may include one or more solvents.

The time for formation of the matrix resulting from contact of the phases is sufficient to generate the matrix as a barrier to further sulfonamide production and is also typically short. As explained above the rapidity with which the matrix is formed bears upon its thickness, density and defect parameters. Preferably the time for matrix formation ranges up to about 800 seconds or up to about 480 seconds, or more preferably up to about 240 seconds or about 120 seconds. The rate of reaction between the sulfonyl compound and the amine compound may be promoted through the use of a catalyst, heat, and/or other reaction acceleration technique. Preferably, the first or second phase includes a catalyst for promotion of sulfonamide bond formation. Preferably, the catalyst is a Lewis base nucleophile such as a nitrogen, phosphorus inorganic or organic compound.

As a fifth development, the invention includes the polysulfonamide membrane or composite membrane prepared according to a process of the invention.

As a sixth development, the invention includes certain polymeric formulas for the sulfonamide polymer matrix. These formulas involve the polymeric reaction product of an aromatic or aliphatic compound having at least two active sulfonyl groups and amine compound having at least two active primary groups and also at least one secondary or tertiary amine group positioned between the two primary amine groups. The semipermeable membrane embodiment of this development is especially useful under harsh acidic conditions (pH≦3).

As a seventh development, the invention involves the use of the foregoing membranes for separation of a fluid mixture into its permeate and retentate. The fluid mixture may contain a mixture of inorganic salts, similar small organic molecules, a low pH and/or corrosive or oxidative substances. The separated permeate may be water or purified organic liquid. The retentate preferably will contain the solute.

As an eighth development, the invention includes a process for separation of a fluid mixture. This process uses the polysulfonamide membrane of the invention to separate the fluid mixture into a permeate and a retentate.

As a ninth development, the invention includes the performance of the polysulfonamide membrane of the invention under harsh conditions such as but not limited to extreme pH, temperature, and/or oxidative conditions. The NF polysulfonamide membrane of the invention is capable of performing significant separation of alkaline, alkaline earth, and transition metal ions as salts from feed solutions that are acidic and/or contain corrosive materials. The NF polysulfonamide membrane of the invention is capable of retaining certain metal ions as inorganic salts while allowing the neutral, acidic, or basic aqueous medium to permeate. Additionally, the membranes of the invention are capable of separating components and/or separating solvent from dissolved solids components of such feed solutions as may come from the mineral separation industry, the paints and coatings industry, the food and cosmetics industry, the metals and fabrication industry, and the plastics industry as well as others. Preferably the polysulfonamide membranes of the invention will continue to perform significant separation from a feed solution even though the feed solution contains strong acids such as sulfuric acid, nitric acid, hydrochloric acid and the like.

As a tenth development, the invention includes an apparatus or device for separation of solutes from a feed solution. The apparatus or device includes a polysulfonamide matrix of the invention (e.g. a membrane or a composite membrane).

As an eleventh development, the invention includes the use of the matrix as an adhesive promoter, a surface lubricant, a chemically resistant coating, or a photoresist.

As a twelveth development, it has been discovered that a sulfonamide polymer matrix comprising 1,3,5-benzenetrisulfonyl residues and alkyldiamine residues wherein some of the 1,3,5-benzenetrisulfonyl residues and alkyldiamine residues form sulfonamide groups in the polymer backbone, possesses an unexpected and advantageously high level of stability toward oxidative conditions. Accordingly, one preferred aspect of the invention provides a sulfonamide polymer matrix comprising 1,3,5-benzenetrisulfonyl residues and alkyldiamine residues, wherein some of the 1,3,5-benzenetrisulfonyl residues and alkyldiamine residues form sulfonamide groups in the polymer backbone. The alkyldiamine can preferably be a compound of formula II: $R^1$—NH—Y—$[(CH_2)_j(NH-R^2)]_m$; wherein Y is $C_1$–$C_{18}$alkyl; each $R^1$ and $R^2$ is hydrogen; m is 1; and j is zero. Preferably, Y is $C_1$–$C_{10}$alkyl; and more preferably, Y is $C_1$–$C_{16}$alkyl. Most preferably, the alkyldiamine is ethanediamine.

Definitions

Unless otherwise stated, the following definitions apply.

The term "matrix" means a regular, irregular and/or random arrangement of polymer molecules. The molecules may or may not be cross-linked. On a scale such as would be obtained from SEM, x-ray or FTNMR, the molecular arrangement may show a physical configuration in three dimensions like those of networks, meshes, arrays, frameworks, scaffoldings, three dimensional nets or three dimensional entanglements of molecules. The matrix is usually non-self supporting and most often is constructed as a coating or layer on a support material. The sulfonamide polymer matrix has an average thickness from about 5 nm to about 600 nm, preferably about 5 to about 400 nm. In usual practice, the matrix is grossly configured as an ultrathin film or sheet. More preferably, the matrix has an average thickness from about 5 nm to about 100 nm, or from about 15 nm to about 100 nm, or from about 25 nm to about 90 nm.

The term "membrane" means a semipermeable matrix.

The term "composite membrane" means a composite of a matrix layered or coated on at least one side of a porous support material.

The term "support material" means any substrate onto which the matrix can be applied. The substrate may be porous or non-porous. Included are semipermeable membranes especially of the micro- and ultrafiltration kind, metal, ceramic, fabric, plastic, wood, masonry, building materials, electronic components, medical components, filtration materials as well as others.

The term "stable," when used to characterize a membrane in acid, means that substantially all of the membrane remains intact after exposure to a solution of about 20% sulfuric acid for one day at 90° C. or 30 days at 40° C., preferably very substantially all of the membrane remains intact under these conditions and especially preferably essentially all of the membrane remains intact under these conditions. In this context of acid treatment, the terms "substantially all, very substantially all and essentially all" mean respectively that the membrane maintains at least 90%, at least 95%, at least 99% of its sulfur-nitrogen sulfonamide bonds after it has been exposed to these conditions. Also, maintaining at least substantially all of the sulfur-nitrogen sulfonamide bonds in certain membrane situations includes an improvement of the original permeation and retention values of the membrane such that the after-test permeation and retention values may be better than the original values.

The term "polyamide" means a polymer having a backbone of repeating carboxamide groups all of the same arrangement (—CONH—) or of alternating reverse arrangement (—CONH—R—NHCO—). The term does not include polymers having sulfonamide groups in the backbone (polymer-$SO_2$—N-polymer).

The term "20% sulfuric acid" means a solution of deionized water and 20% sulfuric acid by weight.

The term "average thickness" is the average matrix cross-sectional dimension. It means the average distance in cross section from one side of the matrix to the opposite side of the matrix. Since the matrix has surfaces that are at least some extent uniform, the average thickness is the average distance obtained by measuring the cross-sectional distance between the matrix sides. Techniques such as ion beam analysis, X-ray photoelectron spectroscopy (XPS), and scanning electron microscopy (SEM) can be used to measure this dimension. Because the cross-sectional dimension usually is not precisely the same at all points of the matrix, an average is typically used as an appropriate measurement. The preferred technique for measuring this dimension is SEM.

The term "permeation" means transmission of a material through a membrane.

The term "A value" in the context of the present invention represents the water permeability of a membrane and is represented by the cubic centimeters of permeate water over the square centimeters of membrane area times the seconds at the pressure measured in atmospheres. An A value of 1 is essentially $10^{-5}$ $cm^3$ of permeate over the multiplicand of 1 centimeter squared of membrane area times 1 second of performance at a net driving pressure of one atmosphere. In the context of the present invention, A values given herein have the following unit designation: $10^{-5}$ $cm^3/(cm^2.sec.atm.)$ or $10^{-5}$ cm/(sec.atm) at 25° C.

A=permeate volume/(membrane area*time*net driving pressure).

The term "recovery value" means the ratio of permeate fluid flow to feed fluid flow, expressed as a percentage. It should be noted that under most circumstances the flux is directly related to the applied trans-membrane pressure, i.e., a membrane can provide a specific flux of permeate at a given pressure. This flux is often given in units of 1 mh.

The term "net driving pressure" is equal to the average trans-membrane pressure minus the feed-permeate osmotic pressure difference.

The term "transmission value" means the solute concentration in the permeate divided by the average of the solute concentration in the feed and in the concentrate, expressed as a percentage [i.e. transmission value=permeate/((feed+concentrate)/2), expressed as a percentage]. The concentrate is the fluid that flows completely past, but not through, the membrane. The term "retention value" means, in the context of the present invention, 100% minus the transmission value. The term "passage" or "% Pass" is equivalent to the transmission value. Unless otherwise stated, the retention and transmission values are achieved by passing a 1800 to 2200 ppm solution of the specified solute in DI water at a pH of 6.5 to 7.5, at 24–26 degrees C., at 221–229 psi trans-membrane pressure, at a recovery value of less than 2%, at a Renyolds number of at least 2000 across the membrane, and by collecting permeate samples for permeation analysis between the first and second hour of testing. The term "recovery value" means, in the context of the present invention, the ratio of permeate fluid flow to feed fluid flow, expressed as a percentage.

The term "aliphatic" or "aliphatic group" is known in the art and includes branched or unbranched carbon chains which are fully saturated or which comprise one or more (e.g. 1, 2, 3, or 4) double or triple bonds in the chain. Typically, the chains comprise from 1 to about 30 carbon atoms. Preferably, the chains comprise from 1 to about 20 carbon atoms, and more preferably, from 1 to about 10 carbon atoms. Representative examples include methyl, ethyl, propyl, isopropyl, pentyl, hexyl, propenyl, butenyl, pentenyl, propynyl, butynyl, pentynyl, hexadienyl, and the like.

The term "cycloaliphatic" or "cycloaliphatic group" is known in the art and includes mono-cyclic and poly-cyclic hydrocarbons which are fully saturated or which comprise one or more (e.g. 1, 2, 3, or 4) double or triple bonds in the ring(s). Such groups comprise from 1 to about 30 carbon atoms. Preferably, from 1 to about 20 carbon atoms, and more preferably, from 1 to about 10 carbon atoms. Representative examples include cyclopropyl, cyclobutyl, cyclopentyl, cyclohexyl, cyclopentenyl, cyclohexenyl, and the like.

The term "aryl" denotes a phenyl radical or an ortho-fused bicyclic carbocyclic radical having about nine to ten ring atoms in which at least one ring is aromatic. Representative examples include phenyl, indenyl, naphthyl, and the like.

The term "heteroaryl" denotes a group attached via a ring carbon of a monocyclic aromatic ring containing five or six ring atoms consisting of carbon and one to four heteroatoms each selected from the group consisting of non-peroxide oxygen, sulfur, and N(X) wherein X is absent or is H, O, ($C_1$–$C_4$)alkyl, phenyl or benzyl, as well as a radical of an ortho-fused bicyclic heterocycle of about eight to ten ring atoms derived therefrom, particularly a benz-derivative or one derived by fusing a propylene, trimethylene, or tetramethylene diradical thereto. Representative examples include furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) quinolyl (or its N-oxide), and the like.

The term "heteroaliphatic" or "heteroaliphatic group" is known in the art and includes branched or unbranched carbon chains wherein the chain is interrupted with one or more (e.g. 1, 2, 3, or 4) non-peroxy oxygen, sulfur or nitrogen atoms. Typically, the chains comprise from 1 to about 30 carbon atoms and from about 1 to about 10 heteroatoms. Preferably, the chains comprise from 1 to about 20 carbon atoms and from about 1 to about 10 heteroatoms; and more preferably, from 1 to about 10 carbon atoms and from about 1 to about 5 heteroatoms. Representative examples include 2-methoxyethyl, 3-methoxypropyl, and the like.

The term "heterocycloaliphatic" or "heterocyclicaliphatic group" is known in the art and includes mono-cyclic and poly-cyclic heterocycles which are fully saturated or which comprise one or more (e.g. 1, 2, 3, or 4) double bonds in the ring, and which comprise one or more (e.g. 1, 2, 3, or 4) non-peroxy oxygen, sulfur or nitrogen atoms in one or more ring. Typically, the rings comprise from 1 to about 30 carbon atoms and from about 1 to about 10 heteroatoms. Preferably, the chains comprise from 1 to about 20 carbon atoms and from about 1 to about 10 heteroatoms; and more preferably, from 1 to about 10 carbon atoms and from about 1 to about 5 heteroatoms. Representative examples include tetrahydrofuranyl, tetrahydrothiophenyl, pyrrolidinyl, piperidinyl, morpholinyl, and dihydropyranyl, and thiomorpholinyl, and the like.

DETAILED DESCRIPTION OF THE INVENTION

The present invention represents a significant advance in the development of membrane technology overall and specifically in the field of polysulfonamide membranes. Typical, known polysulfonamide membranes have low water flux and sodium chloride retention capabilities. They are unable to perform in a manner comparable to that of commercial polyamide RO and NF membranes. The membranes of the present invention, however, present improved performance and durability properties.

The sulfonamide polymer matrix of the present invention can have a number of differing functions depending upon its composition, its preparation process and the support material with which it is combined. Such combinations may act as semipermeable membranes, lubricants, bioactive materials, binding membranes, drug reservoirs, photoresists, catheters, chromatographic materials, semiconductor wafers as well as others. In the combination as a semipermeable membrane, the matrix may provide properties of nanofiltration and reverse osmosis depending upon the design of the matrix. Additionally, the polymer molecules constituting the matrix may be formed into microporous or ultraporous coatings that may function as microfiltration or ultrafiltration membranes. Such coatings may be combined with appropriate support materials or may simply be a skin on a core of the same molecular configuration (i.e. an asymmetric membrane).

Preferably, the sulfonamide polymer matrix in combination with a support material according to the invention performs as a semipermeable composite membrane. Because of its extremely thin character, the polymer matrix of the present invention is most often formed as a composite on a porous or microporous support material when it is used in one of its preferred forms for nanofiltration or reverse osmosis. The composite membrane of the invention has a high flux and a high ability to reject inorganic salts compared to known sulfonamide materials. Additionally, the composite membrane of the invention can function under harsh conditions such as strong acid (e.g. pH≦about 3, 2, or 1) and highly corrosive conditions.

The sulfonamide polymer matrix of the invention has an average thickness ranging from about 5 nm to about 600 nm, preferably from about 5 nm to about 400 nm. More preferably, the polymer matrix has an average thickness of from about 10 to about 200 nm, especially more preferably from about 10 to about 150 nm, most preferably about 15 to about 100 nm, and especially most preferably about 15–20 nm to about 70–90 nm.

In another preferred embodiment, the sulfonamide polymer matrix of the invention has an average thickness ranging from about 5 nm to about 100 nm, preferably from about 15 nm to about 100 nm; and, more preferably, from about 25 nm to about 90 nm.

The sulfonamide polymer matrix of the invention preferably has a density that enables high permeation and flux yet enables significant retention when the matrix is configured as a semipermeable membrane. The matrix of the invention may have a density of from about 0.25 g/cc to about 4.0 g/cc, preferably from about 0.3 g/cc to about 3 g/cc, more preferably from about 0.5 to about 2.0 g/cc, especially more preferably about 0.7 g/cc to about 1.7 g/cc, most preferably a density of from about 0.8 to about 1.6 g/cc. The mass to area ratio of the polymer matrix to the final membrane area may be from about 10 to 400 mg. per meter squared, preferably from about 20 to about 200 mg. per meter squared, more preferably from about 50 to about 150 mg per meter squared or from more preferably from about 30 to about 150 mg per meter squared, most preferably from about 40 to about 100 mg per meter squared.

The sulfonamide polymer matrix of the invention is typically has defects of no more than about 10 percent of its volume, preferably no more than 5 percent, especially preferably no more than 2 percent and most especially no more than about 1 percent. In particular, a preferred matrix according to the invention is preferably substantially free, more preferably very substantially free, and most preferably essentially free of defects.

The sulfonamide polymer is the reaction product of one or more sulfonyl compounds having at least two active sulfonyl groups and one or more amine compounds having at least two active amine groups. The sulfonyl and amine compounds may be monomers, polymers, oligomers, building blocks, condensation molecules, reactive units, complex molecules or other organic moieties having the active sulfonyl groups or amine groups respectively. These descriptions have overlapping definitions which may be determined from general organic chemistry texts such as "Organic Chemistry" 6$^{th}$ or 7$^{th}$ by R. Morrison and R. Boyd, Allyn & Bacon Pub.; or "Advanced Organic Chemistry", 4$^{th}$ Ed. by J. March, Wiley Interscience, as well as in "Hawley's Condensed Chemical Dictionary", 11$^{th}$ Ed., Sax and Lewis, Van Nostrand. For example, the oligomers may be repeating units linked by condensation groups or other groups that will link together including but not limited to ether, amine and other groups discussed above.

In particular, the sulfonyl compound and amine compound may be based upon any unsubstituted or substituted organic nucleus. The organic nucleus may optionally contain heteroatoms and preferably contains 1 to about 30 carbon atoms. Preferably, the sulfonamide polymer matrix may be at least partially cross-linked. Preferably, the cross-linking is achieved though the use of at least some sulfonyl compound and/or amine compound with three or more active sulfonyl or amine groups respectively. Cross-linking may also be provided by small molecules that will react with amine or sulfonic acid groups. Such small molecules include but are not limited to polyisocyanates, polyepoxides, activated polyesters and the like.

Although it is not intended to be a limitation of the invention, it is believed that when it is configured as a semipermeable membrane, the sulfonamide matrix of the invention exhibits superior flux and retention properties as a result of its ultra thin character, its density or mass per unit area, and its substantial freedom from defects. It is believed that rapid formation of the matrix, as well as the application of heat during the matrix formation, contributes to the development of these properties. It is also believed that a low degree of roughness provides lower membrane fouling propensity.

As explained below, one process for the preparation of the sulfonamide polymer matrix involves an interfacial polymerization of the compounds. A rapid interfacial polymerization of the compounds is believed to contribute to the formation of the sulfonamide polymer matrix having the foregoing desirable attributes. A theory about the mechanism of interfacial polymerization is that one or more minivolumes of reaction media or reaction zones are believed to exist adjacent to the two-phase interface of the reaction media and are believed to be the location(s) in which the polymerization reaction takes place. As the reaction proceeds, a matrix forms and diffusion of further compound into the reaction zone or zones is believed to become limited by the newly formed polymer matrix. It is believed that if the reaction between the two compounds in this reaction zone occurs at a rapid rate the zone or zones will be small, and the resulting matrix will be thin and dense. It is believed that if the compound reaction is slow, matrix formation is slow and a greater portion of unreacted compound is able to diffuse from one phase into a significant volume of the opposite phase with the result of a larger reaction zone or zones. A thicker polymer matrix having a higher degree of void spaces or defects is believed to be the result of such larger reaction zones. Moreover, it is believed that if a defect forms in the matrix, for example, as a result of void space formation, or a disturbance of the matrix, compound is believed to be able to diffuse through the defect and react to fill it. If the reaction is slow, the compound may be able to diffuse out of the defect and into a significant portion of the opposite phase, leading to a large reaction zone and correspondingly thicker matrix.

A rapid rate of compound reaction relative to the unreacted compound diffusion rate is believed to produce small reaction zones. Moreover, a polymeric barrier preventing further compound contact and reaction is believed to rapidly develop in the small zone construct. It is believed that achievement of such a barrier to compound diffusion within a time ranging up to about 800 seconds (preferably about 480 seconds) is sufficient to produce the ultra thin, highly dense matrix according to the invention. It is believed that this time-barrier interaction provides for the high flux and high retention capability of the resulting polymer matrix. While this theory of matrix production can explain the character of the matrix, other theories are also capable of similar explanation.

Notwithstanding these theories for matrix production, it has been found that promotion of a rapid reaction rate between the sulfonyl compound and the amine compound in an interfacial process provides an ultra thin, dense polymer matrix according to the invention. Generally, the interfacial technique is known in the art such as for preparation of nylon materials and for membrane preparation as is described in U.S. Pat. Nos. 4,277,344; 4,761,234; 4,765,897; 4,950,404; 4,983,291; 5,658,460; 5,627,217; and 5,693,227. A typical interfacial process for the slow formation of the polysulfonamide composite membrane follows the processes described in U.S. Pat. Nos. 3,744,642 and 5,693,227. These processes are altered according to the present invention to achieve preparation of the sulfonamide matrix of the invention.

According to the process of the invention, a first phase containing a sulfonyl compound having at least two active sulfonyl groups is reactively contacted with a second phase containing an amine compound having at least two active amine groups. The time during which the reactive contact takes place is the time needed for formation of matrix. This duration ranges up to about 900 seconds, preferably up to about 600 seconds, more preferably up to about 480 seconds, 240 seconds or 120 seconds, most preferably up to about 60 seconds.

One aspect of the invention provides a process for preparing a sulfonamide polymer matrix comprising: contacting a first phase comprising an amine compound having an organic nucleus and at least two primary and/or secondary amine groups, with a second phase comprising a sulfonyl compound having an organic nucleus and at least two sulfonyl groups capable of forming sulfonamide bonds with an amine group to form the matrix of sulfonamide polymer, wherein the time for formation the matrix is less than 900 seconds. It is to be understood that a small amount of residual amine and sulfonyl reactive groups may remain and react after this time period, without departing from the scope of the invention.

The first and second phases may be miscible or immiscible. As used herein, miscible means capable of forming a single phase, and immiscible means incapable of forming a single phase.

The first and second phases may be neat starting materials or they may include one or more solvents. The phases may mix at least to some extent or not mix. Although neat amine compound and neat sulfonyl compound can be used as the first and second phases if they are liquids, a typical process involves dilution of the amine compound and sulfonyl compound with first and second solvents that preferably are immiscible.

They also may preferably provide at least a degree, however minor, of solubility to both the sulfonyl compound and the amine compound. Preferably, a solvent is inert toward the reactant and the support material. Preferably, the solvent for the amine compound is water or an alkyl, aryl or arylalkyl alcohol or polyol. Preferably, when the solvent for the sulfonyl compound is an organic solvent, the organic solvent may be chosen to have a density less than that of the solvent for the second phase. Although in some processing situations of the invention, the organic solvent may have a density greater than that of the solvent for the second phase.

Preferably, the solvent for the sulfonyl compound is an organic solvent that is substantially immiscible in water or the alcohol solvent used for the amine compound. The organic solvent/hydroxylic solvent order can also be reversed so that the sulfonyl compound is placed in water or alcohol. This reversed solvent process is useful under some circumstances.

If the reaction rate between the compounds is not sufficient to enable matrix formation according to the reaction duration given above, the reaction between compounds may be promoted by any suitable technique. Such techniques typically will positively influence the rate of reaction between the compounds. Catalysts may be used. Increased temperature may be used. A solvent that promotes the nucleophilic character of the amine may be used. Solvents that stabilize polar reaction intermediates or reaction transition states may be used. Highly mobile leaving groups on the sulfonyl moiety of the sulfonyl compound may be used.

The reactant concentrations in the interface reaction zone may be promoted.

Typical rate promoters include the use of a catalyst such as a Lewis base, a nucleophilic agent that is capable of interacting with an active sulfonyl group. Phosphorus and nitrogen containing organic compounds can function in this capacity. Examples include tertiary amines and aromatic amines such as pyridine, and 4-(N,N-dimethylamino) pyridine, 4-piperidinopyridine, imidazole and phosphines such as triphenyl phosphine. Further examples are given in U.S. Pat. No. 5,693,227.

The sulfonyl compound useful according to the process of the invention to form the sulfonamide polymer matrix may be any sulfonyl compound as described above. The sulfonyl compound may be a sulfonic acid precursor, which is converted into the sulfonyl compound by formation of sulfonyl groups activated with leaving groups. The sulfonyl compound may contain least two activated sulfonyl groups and preferably may be a mixture of di and tri activated sulfonyl group compounds. The sulfonyl compound may also include at least in part a species with tetra and higher activated sulfonyl groups.

Preferably, the sulfonyl compound may be composed of any organic nucleus and preferably is a compound of Formula I.

$$X-SO_2-Z-(SO_2-X)_n \quad\quad\quad I$$

The Z and X groups of Formula I may be any as described above. Preferably, the Z group may be an organic nucleus of 1 to 30 carbons or any corresponding hetero nucleus including nitrogen or sulfur or oxygen within the hetero nucleus. The preferred Z nucleus has a multiple number of sulfonyl group functional sites ranging from one to six or more. Additionally, the Z group may be substituted as described above. Preferably, these substituents may be halogen, ether, nitrile, alkyl, alkoxy, amine, amide, urethane, urea, carbonate, thioether and/or ester groups. Alkyl, alkenyl, cycloalkyl, alkylcycloalkyl, cycloalkenyl, alkylcycloalkenyl, aryl, arylalkyl, dialkylether, cycloalkyl and aryl groups and the corresponding groups containing nitrogen and sulfur, and each having from 1 to 30 carbon atoms as is appropriate for the named groups are useful as preferred Z nuclei. Preferably, the Z nucleus is $C_1$–$C_{18}$ alkyl, $C_2$–$C_{18}$ alkenyl, $C_3$–$C_7$ cycloalkyl, $C_4$–$C_{16}$ alkylcycloalkyl, $C_3$–$C_7$ cycloalkenyl, $C_4$–$C_{16}$ alkylcycloalkenyl, $C_6$–$C_{14}$ aryl, $C_6$–$C_{10}$ aryl-$C_1$–$C_8$ alkyl, or $(C_6$–$C_{10})$aryl-$C_1$–$C_8$ alkyl-$(C_6$–$C_{10})$aryl; with the sulfonyl valence (n of Formula I) being 1,2 or 3. More preferred Z groups include $C_1$ to $C_{18}$ alkyl, $C_6$ to $C_{14}$ aryl, and $C_1$ to $C_8$ alkyl. Especially preferred Z groups include $C_6$ to $C_{14}$ aryl, such as phenyl, naphthyl or anthracenyl.

Leaving groups "X" which provide activated sulfonyl groups include halogens, sulfonyl anhydrides, activated sulfonyl esters, and other known leaving groups. Examples include tosylates, brosylates, nosylates, mesylates, perchlorates, alkanesulfonate esters, fluorosulfonates, triflates and nanoflates, trislates and azides. The definitions of these groups as well as techniques for their formation are given in J. March, *Advanced Organic Chemistry*, 4th Ed., Wiley-Interscience, New York 1992, which is incorporated in its entirety herein by reference. Many of these leaving groups are themselves sulfonates so that a sulfonate anhydride is formed as the active sulfonyl group. Particularly preferred are the halides such as chloride, fluoride, bromide and iodide. These leaving groups constitute X of preferred Formula I above.

Preferred amine compounds useful according to the process of the invention to form the sulfonamide polymer include those of Formula II.

$$R^1-NH-Y-[(CH_2)_j(NH-R^2)]_m \quad\quad\quad II$$

In Formula II, Y may be any group as discussed above. Preferably, Y may be an organic nucleus of 1 to 30 carbon atoms and optionally including oxygen, sulfur or nitrogen atoms. Included are alkyl, alkenyl, cycloalkyl, alkylcycloalkyl, cycloalkenyl, alkylcycloalkenyl, aryl, arylalkyl groups of $C_1$ to $C_{30}$ carbon atoms as is appropriate for the named groups with optional nitrogen, sulfur or/and oxygen atoms. The R groups of Formula II may preferably and independently be hydrogen, $-N(R^4)_2$, $C_1$–$C_8$ alkoxy, $C_1$–$C_{18}$ alkyl, $C_2$–$C_{18}$ alkenyl, $C_3$–$C_8$ cycloalkyl, $C_3$–$C_8$ cycloalkenyl, $C_4$–$C_{20}$ alkylcycloalkyl, $C_4$–$C_{20}$ alkylcycloalkenyl, $C_6$–$C_{10}$ aryl, or $C_6$–$C_{10}$ aryl-$C_1$–$C_8$ alkyl. The $R^4$ groups are independently hydrogen, $C_1$–$C_8$ alkoxy, $C_1$–$C_{18}$ alkyl, $C_2$–$C_{18}$ alkenyl, $C_3$–$C_8$ cycloalkyl, $C_3$–$C_8$ cycloalkenyl, $C_4$–$C_{20}$ alkylcycloalkyl, $C_4$–$C_{20}$ alkylcycloalkenyl, $C_6$–$C_{10}$ aryl, or $C_6$–$C_{10}$ aryl-$C_1$–$C_8$ alkyl. Examples of Y with oxygen, nitrogen or sulfur atoms include ether units, secondary or tertiary amine units and thioether units. Examples include oxydiethylenyl, azadiethylenyl, and thiodiethylenyl. Preferably, Y may be $C_1$–$C_{18}$ alkyl, $C_2$–$C_{18}$ alkenyl, $C_3$–$C_7$ cycloalkyl, $C_4$–$C_{16}$ alkylcycloalkyl, $C_3$–$C_7$ cycloalkenyl, $C_4$–$C_{16}$ alkylcycloalkenyl, $C_6$–$C_{10}$ aryl, $C_6$–$C_{10}$ aryl-$C_1$–$C_8$ alkyl $(C_6$–$C_{10})$aryl-$C_1$–$C_8$ alkyl-$(C_6$–$C_{10})$aryl or $C_1$–$C_{18}$-$NHR^3$. The $R^3$ group may be hydrogen, $C_1$–$C_8$ alkoxy, $C_1$–$C_{18}$ alkyl, $C_2$–$C_{18}$ alkenyl, $C_3$–$C_8$ cycloalkyl, $C_3$–$C_8$ cycloalkenyl, $C_4$–$C_{20}$ alkylcycloalkyl, $C_4$–$C_{20}$ alkylcycloalkenyl, $C_6$–$C_{10}$ aryl, or $C_6$–$C_{10}$ aryl-$C_1$–$C_8$ alkyl.

Reaction temperature also can facilitate a higher rate of reaction. Conduction the reaction at higher than ambient temperature will promote the reaction between the active sulfonyl groups and the active amine groups, and will also facilitate the transfer of compound from its parent phase to the interfacial reaction zone. The reaction temperature is constrained by the boiling points of the solvents preferably being employed in the reaction although under certain circumstances such as under higher than ambient pressure, the temperature of reaction can exceed the normal boiling point of the solvent. Preferably, the temperature of the reaction may range from ambient to 250° C. or more, more preferably from about 30° to about 200° C. Heat can conveniently be applied by heating one or both of the reaction phases, and/or by carrying out all or a portion of the matrix formation in an oven.

The solvents selected also have an effect upon the reaction rate and size of the reaction zone. For example, one solvent may be water or $C_1$ to $C_3$ alcohol or polyol while the other solvent may be any organic liquid. Alternatively, one solvent may be water and the other may be a $C_2$ to $C_6$ alcohol or mixture of alcohol and another organic solvent. Such organic liquids include $C_5$ to $C_{12}$ aliphatic hydrocarbons, aromatic hydrocarbons such as benzene, substituted aromatic hydrocarbons such as halobenzene, monoglyme, diglyme, polyethers, hydrocarbon mixtures, petroleum ether as well as fluorinated and fluorochlorocarbons such as carbon tetrachloride, chloroperfluoroethane, the freons, and the like. Further examples of these organic liquids include $C_2$ to $C_{10}$ ethers, $C_3$ to $C_{10}$ ketones and $C_3$ to $C_{12}$ aliphatic esters. Preferably, mixtures of such organic liquids can also be employed to improve solvent properties. The two kinds of solvent can be miscible so long as the reaction is conducted in a fashion to produce the matrix as an ultra thin film. Such operations would include metering the first phase followed by rapid immersion and removal of the second phase.

Partially miscible solvents can also be employed in some circumstances to promote the reaction rate of the sulfonyl compound and the amine compound. The partial miscibility may sometimes increase the diffusion rate of the compounds so that if their reaction is fast, the overall rate of matrix formation can be promoted. Use of solvents such as ethyl acetate or acetone and water to produce certain types of sulfonamide polymer matrices can be of benefit when it is desired to have polymeric chains with terminal sulfonic acid groups.

Furthermore, use of mixed organic solvents, which increase the total polarity of the organic solvent system, may be of benefit to faster reaction rates. A more polar organic phase will tend to stabilize the polar transition states of the sulfonamide reactants and also stabilize any polar intermediates in the reaction. This stabilization can lead to faster reaction times. For example, glyme can be used to solubilize a sulfonyl halide compound. Then, this solution may be placed into an Isopar (e.g. Isopar G). Additives such as aromatics, esters, ethers, ketones and nitriles can also be combined with the organic phase to facilitate dissolution of the sulfonyl compound and/or to facilitate the polymerization reaction.

The concentrations of compounds in solvent range typically are in a range that will promote fast reaction but will under most circumstances avoid polymer agglomeration into gel particles and the like although there are situations where formation of gel particles of the sulfonamide polymer may be useful for the preparation of the composite membrane of the invention. Usually, the compound concentrations in the two phases may differ to some extent. The compound concentrations for amine and sulfonyl compound may range from about 0.01 percent to about 100 percent (i.e., neat) by weight relative to the total weight of the mixture, preferably, about 0.1 percent to about 50 percent, more preferably about 0.5 percent to about 20 percent, most preferably about 0.5 percent to about 10 percent by weight. Typical amine concentrations may be from about 0.75 weight percent to about 4 weight percent, preferably about 1 to about 2 weight percent.

Typical sulfonyl compound concentrations can be from about 0.01 percent to about 10 percent by weight relative to the total weight of the mixture, preferably, about 0.03 percent to about 3 percent, more preferably about 0.05 percent to about 0.8 percent, most preferably about 0.05 percent to about 0.3 percent by weight.

Generally, any inert support material having pore sizes from about 0.001 to about 50 microns in diameter can be used. The support material may be interwoven glass fibers, metal fibers, polymeric fibers, porous or woven sheets of such fibers, paper or paper-like materials and microporous supports made of polysulfone, polyethersulfone, polyacrylonitrile, cellulose ester, polypropylene, polyvinylchloride, polyvinylidenefluoride and polyarylether ketones as well as any combination thereof. Ceramics, including ceramic membranes, glass and metals in porous configurations can also be used.

For composite membrane applications, the support material preferably has an A value greater than 10, more preferably greater than 40, and even more preferably greater than 100. Additionally, the support material preferably has a molecular weight cut off (measured by the ASTM method at 90% dextran rejection) of less than 500,000, more preferably less than 100,000, more preferably less than 30,000, and most preferably less than 20,000. It may also be preferred to treat the porous support material with corona, e-beam, or other discharge technique to facilitate coating techniques.

Further additives and adjunct materials may be included within the polymer matrix of the invention so long as they do not inhibit the two compounds from forming the sulfonamide polymer. These additives may be plasticizers, ionicity enhancers, wetting agents such as surfactants, desorption agents, surface modifiers, smoothing agents, acid acceptors, flux enhancing agents, drying agents, antifoaming agents and defoaming agents. These additives and materials may be inert or functional toward promotion of semipermeation of solutions by RO and NF membranes. In a typical process for preparation of a composite membrane of the invention, a roll of selected support material is contacted with an aqueous solution of the amine compound such as ethylene diamine at an appropriate concentration such as about 1 to about 5, preferably about 1.5 to about 3, more preferably about 2 percent by weight relative to the total weight of reactants, and a catalyst such as pyridine, trimethyl amine, dimethylaminopyridine or triphenyl phosphine. After the support material is removed from the aqueous solution, excess amine solution may be removed via an air knife.

The support material coated with aqueous amine and catalyst is then passed through a solution bath containing the sulfonyl compound such as 1,4-benzenedisulfonyl chloride in an organic liquid such as petroleum ether, ligroin, diglyme/higher hydrocarbon, an Isopar, naphtha solvent or a mixture of monoglyme and Isopar G. The concentration of sulfonyl compound is the organic liquid may range from about 0.1 to about 1, preferably about 0.1 to about 0.5, more preferably about 0.15 percent by weight relative to the total weight of reactants The bath pass through is conducted at such a rate as to allow thorough coating of the organic phase onto the aqueous phase coating on the support material. As the coated support material exits from the organic phase, it will be coated with the organic phase. The compounds in the two phases react to form the polymeric matrix.

The duration of contact between the aqueous phase coating on the support material and overcoat of the organic phase of sulfonyl compound is maintained for a time sufficient to produce a dense ultrathin film of the matrix on the support. Depending upon the rate of the reaction, this duration may simply be the time for the bath pass-through or it may be the pass through plus carry time until the organic phase is subsequently removed. After the matrix is formed, the membrane may be thereafter quenched and washed to remove excess reactant. The amine and/or organic phase can be metered quantitatively using coater techniques that are known, such as, slot-die coating and gravure coating. The membrane can be dried by application of moderate heat so that the organic liquids and often the water solvent are evaporated. In order to prevent loss of permeation ability when drying is carried out, drying agents may be combined with the membrane. These agents like those described for use with polyamides such as in U.S. Pat. Nos 4,948,507; 4,983,291; and 5,658,460.

Included are such agents as ammonium salts of acids, primary, secondary, and tertiary ammonium salts of acids, quaternary ammonium salts of acids, glycols, organic acids, saccharides, and the like. Examples include glycerin, citric acid, glycols, glucose, sucrose, triethylammonium camphorsulfonate, triethylammonium benzenesulfonate, triethylammonium toluenesulfonate, triethylammonium methane sulfonate, ammonium camphor sulfonate, and ammonium benzene sulfonate. This application can be accomplished by addition of the drying agents to one of the solvent phases before membrane formation or by addition of the compound directly to the membrane before or after the matrix is formed.

Flux enhancement is another membrane treatment technique that is useful for increasing the flux of the membrane. A flux enhancer according to the invention can be added to either of the phases before membrane formation, may be added to the support material as the phases contact each other or may be post added to the matrix. The flux enhancers are usually low molecular weight (e.g. $\leq 400$) amines and alcohols, which volatilize to at least some extend during the drying stage. Their use in this fashion tends to enhance the flux ability of the membrane without lessening the retention value. Examples include diethylamine, ethylene diamine, triethanolamine, diethanolamine, ethanolamine, methanol, ethanol, isopropyl alcohol, guaiacol, and phenol, as well as polar aprotic solvents such as DMF, DMSO, and methyl isobutylketone.

The membrane may be further processed to remove residual chemicals, adjust performance, and/or to apply a protective coating. For example, post formation treatment with chlorinating agents, amine methylating agents, oxidizing agents and the like may provide performance improvements. After such optional treatment, the membrane is ready for use. The membrane may also be stored for later use.

Properties

The permeability and retention properties of the polymer matrix of the invention provide significant advantages. The permeability of the composite membrane of the present invention made with the polymer matrix can be measured by its A value. Typically, the composite membranes of the invention have water permeability A values greater than those reported for sulfonamide RO membranes. Preferably, either as an RO or an NF membrane, the polysulfonamide membrane of the present invention has a water permeability A value of at least about 10, preferably about 12; more preferably about 14; especially more preferably about 16 and most preferably about 20 when the A value is the sole parameter being used to describe the membrane.

Preferably, the polysulfonamide membrane of the present invention, as an RO membrane, has a sodium chloride retention value of at least about 98.5 percent, more preferably at least about 99 percent, especially preferably at least about 99.5 percent when the retention is the sole parameter being used to describe the membrane.

Preferably the polysulfonamide membrane of the present invention, preferably as an RO membrane, has a combination of an A value and sodium chloride retention that define a curve plotted as a arc of a circle with the horizontal axis being the A value and the vertical axis being the retention value. The extreme ends of the curve are at A=1, ret=99.5 (top end) and A=12, ret=5 (bottom end).

Preferably, the polysulfonamide membrane of the invention has an A value of at least 12 and sodium chloride retention value of at least about 10 percent, preferably an A value of at least about 12 and NaCl retention value of at least about 50 percent, more preferably an A value of at least about 11 and an NaCl retention value of at least about 70 percent, better—at least about 80 percent, best—at least about 90 percent; especially preferably an A value of at least about 7 with an NaCl retention of at least about 80 percent, better—at least about 90 percent, best—at least about 95 percent, more especially preferably an A value of at least about 5 with an NaCl retention of about 85 percent, good— at least about 90 percent, better—at least about 95 percent, best—at least about 98 percent; most preferably an A value of at least about 3, with an NaCl retention of at least about 85 percent, good—at least about 90 percent, better—at least about 95 percent, special—at least about 98 percent, best— at least about 99 percent; especially most preferably, an A value of at least about 1 with an NaCl retention of at least about 90 percent, good—at least about 95 percent, better—at least about 98 percent, best—at least about 99 percent.

A preferred membrane of the invention has an A value in the range of about 1 to about 12 and a sodium chloride retention of at least about 98 percent.

Another preferred membrane of the invention has an A value in the range of about 1 to about 12 and a sodium chloride retention of at least about 99 percent.

Preferably, the polysulfonamide membrane of the present invention, preferably as an NF membrane, provides magnesium sulfate retention (when tested on a 2000 ppm magnesium sulfate feed in DI water) and sodium chloride transmission values (when tested on a 2000 ppm sodium chloride feed in DI water) respectively of at least about 90 percent and at least about 50 percent, preferably at least about 95 percent and at least about 50 percent, more preferably at least about 90 percent and at least about 70 percent, most preferably at least about 95 percent and at least about 75 percent. Preferably, the A value for the membranes with these retention—transmission values has an A value of at least about 4.5. The transmission values are measured in the same fashion and under the same conditions as the retention values.

Preferably, the polysulfonamide membrane of the present invention, preferably as an NF membrane, provides a sodium sulfate retention (when tested on a 2000 ppm sodium sulfate feed in DI water) and magnesium chloride transmission (when tested on a 2000 ppm magnesium chloride feed in DI water) values respectively of at least about 90 percent and at least about 30 percent, preferably at least about 95 percent and at least about 30 percent, more preferably at least about 90 percent and at least about 60 percent, most preferably at least about 95 percent and at least about 60 percent. Preferably, the A value for the membranes with these retention—transmission values has an A value of at least about 9.

Preferably, the polysulfonamide membrane of the present invention, preferably as an NF membrane, provides a sodium sulfate retention (when tested on a 2000 ppm sodium sulfate feed in DI water) and sodium chloride transmission (when tested on a 2000 ppm sodium chloride feed in DI water) values respectively of at least about 90 percent and at least about 50 percent, preferably at least about 95 percent and at least about 50 percent, more preferably at least about 90 percent and at least about 75 percent, most preferably at least about 95 percent and at least about 75 percent. Preferably, the A value for the membranes with these retention—transmission values has an A value of at least about 4.5.

Preferably, the polysulfonamide membrane of the present invention, preferably as an NF membrane, has a magnesium sulfate retention (when tested on a 2000 ppm magnesium sulfate feed in DI water) and magnesium chloride transmission (when tested on a 2000 ppm magnesium chloride feed in DI water)values respectively of at least about 90 percent and at least about 30 percent, preferably at least about 95 percent and at least about 30 percent, more preferably at least about 90 percent and at least about 60 percent, most preferably at least about 95 percent and at least about 60 percent. Preferably, the A value for the membranes with these retention—transmission values has an A value of at least about 9.

The composite membranes of the invention are also capable of withstanding exposure to strong acid such as sulfuric, hydrochloric, nitric and/or phosphoric acids. The stability can be tested by exposure of the membrane to a 20% sulfuric acid solution for 30 days at 40° C. or 24 hours at 90° C. followed by testing the membrane to determine whether the sulfonamide backbone of the polysulfonamide has been degraded. The integrity of the polymer may be examined by spectroscopic techniques. The presence of sulfonic acid groups and/or amine or protonated amine groups may be determined. Moreover, the A value and sodium chloride retention value of the exposed membrane may be examined.

In some situations, primarily involving sulfonamide polymers derived from amine compounds having secondary amine groups as well as primary amine groups, the acid exposure conditions the membrane so that the A value and sodium chloride retention value may become improved over their original values. Generally, the composite membranes of the present invention have been found to be substantially stable or preferably exhibit improved properties under these conditions. Preferably, very substantially all of the membrane remains intact and especially preferably, essentially all of the membrane remains intact under these conditions. Preferably, the membranes of the invention that display substantial stability to strong acid conditions contain cation forming substituents either within their matrix polymer backbones or as substituents pendent to the matrix polymer backbone. These membranes display significant ability to separate metal ions in strongly acidic aqueous media.

The properties of the semipermeable membranes of the invention, preferably when used as NF membranes, include their capability to concentrate metal ions contained in a strongly acidic medium. For example, the semipermeable membranes of the invention are capable of at least 50% retention of copper ions and transmitting sulfuric acid when used with a 20% sulfuric acid solution of approximately 10% copper sulfate and a flux of equal to or greater than 1 gfd and a feed solution pressure of about 600 psi transmembrane pressure at ambient temperature (i.e. about 25° C.). Acidic solutions of iron, and other transition metals can also be treated in this fashion. Preferably, these membranes contain cation forming groups as discussed above.

When functioning as semipermeable membranes, the invention displays a significant service life. For example, the semipermeable membranes of the invention may operate in continuous use for at least one month, preferably 6 months, more preferably 1 year, especially preferably 1 to 5 years, most preferably more than 5 yrs.

As mentioned above, the properties of ultra thinness and freedom from flaws or defects are goals, which will contribute to high flux and high retention capability of the membranes of the invention. According to the present invention, the ultra thinness of the polymer matrix is measured as an average thickness. For the sulfonamide polymer matrices of the present invention, that average thickness ranges from about 5 nm to about 600 nm. Preferably, this average thickness ranges from about 5 nm to about 400 nm. Especially preferably, this average thickness ranges from about 10 nm to about 200 nm and especially from about 15 to about 100 nm, most especially preferably from about 15 to about 70–90 nm. The average thickness is preferably measured by scanning electron micrographs (SEM). Examples of the protocol for obtaining such measurements are given in the following experimental section. Generally, for a RO membrane, small void spaces, on the order of molecular or atomic size such as from about 2 angstroms to about 50 angstroms in cross sectional dimension are thought to provide the intermolecular pathways for permeation of the solute. These small intermolecular pathways are thought be curved, branched and/or of a tortuous course. They are thought to be of a physical and chemical character such that they prevent passage of solute. The physical character of the intermolecular pathways involves the physical dimension alone so that permeation occurs based upon molecular weight and three—dimensional shape. The chemical character of the intermolecular pathways involves the lipophilic, hydrophilic, ionic and polar groups within the intermolecular pathway.

Generally for a NF membrane, the small void spaces thought to form the permeation pathways are believed to be slightly larger than those of a RO membrane. The NF membrane pathways are believed to be of cross sectional dimension such as from about 5 angstroms to about 70 angstroms. These intermolecular pathways are thought to be of a physical and chemical character such that they allow greater permeation of one solute relative to another. Moreover, they are believed to enable retention of similar organic molecules based upon physical (e.g. molecular size) and chemical (e.g. polarity) differences.

Matrix defects constitute large void spaces or pores or channels within a matrix for a RO or NF membrane. These defects in the polymer matrix are thought to affect the overall averages of intermolecular pathway size and chemical character. As a result, the defects can increase the probability that the retention capability of the membrane will not operate at preferred values.

The term "defects" with respect to NF membranes means continuous pores, voids or free volume regions larger than about 5 nm to 10 nm in their smallest cross sectional dimension and more preferably larger than about 2 nm in such dimension which substantially span the matrix in cross-section.

The term "defects" with respect to RO membranes means continuous pores, voids or free volume regions larger than about 3 nm to 8 nm in their smallest cross sectional dimension and more preferably larger than about 1.5 nm in such dimension, which substantially span the matrix in cross section. "Substantially free" in the context of defects in either the RO or NF matrix means that no more than about 2% of the volume of the matrix includes such defects. Very substantially free of defects means that no more than about 1% of the volume of the matrix includes such defects. Essentially free means that no more than about 0.1% of the volume of the matrix includes such defects. The presence of defects in NF and RO membranes can be determined by the dye staining technique, described in detail below.

Consequently, the presence of void space within the membrane is both an advantage and a disadvantage. It is an advantage because angstrom sized void spaces provide the interstitial pathways for permeate passage through the matrix but can hinder the permeation of dissolved salts or small organic molecules. It is a disadvantage when these void spaces become so large that they permit significant passage of a solute that is not intended to permeate. The disadvantageous void spaces, which are believed to present large defects, may, but not necessarily, extend completely through the matrix. These larger void spaces may present curved, branched or wandering intermolecular pathways but also may present relatively large channels passages through or almost through the matrix. The defects may permit passage of feed solution components such as solute that otherwise would be rejected by the matrix. The defects also may permit coagulation of solute such that the matrix becomes impermeable. In particular, a defect may encompass at least 90% of the matrix cross-section between one edge and the opposite edge, preferably no more than 60% of this cross-sectional distance, most preferably no more than about 25% of this cross-sectional distance. When the defects completely penetrate the matrix, even though the pathway may be tortuous, there is a direct line for passage of the solute through the matrix.

Although there is a volume percent of the matrix of the invention that may be occupied by defects, that volume percentage is low enough to enable a high sodium salt retention for RO or is low enough to enable a high divalent cation salt retention for NF membranes. Under most circumstances, defect volume percent of the matrix of the invention is at least no more than about 10% of the total volume of the matrix. More preferably, the defect volume percentage is at least less than about 5% of the matrix volume. Especially preferably, the defect volume percentage of the polymer matrix of the present invention is at least less than about 2% of the matrix volume. Most preferably, the defect volume percentage of the polymer matrix of the present invention is at least less than about 1% of the matrix volume. Under preferred process and performance conditions, the matrix of the invention is preferably substantially free of defects, more preferably, very substantially free of defects, most preferably essentially free of defects.

The defect size and the volume percentage of defects relative to the matrix volume can be measured by a number of techniques. Included are the dye stain technique described below and scanning electron micrographs, as well as other techniques for examining macromolecular structures.

The composite membranes made with the polymer matrices of the present invention have been found to display a significant improvement in A value and percent salt retention over known sulfonamide membranes. It is believed that these advantages are in part the result of the ultra thin character, density, mass per unit area and freedom from defects of the polymer matrices of the present invention. It is also believed that the application of heat during the formation of the matrix results in one or more of these advantages (e.g. improved A value). These physical properties translate into the differing and advantageous function for the matrices of the present invention.

Apparatuses and Uses

The sulfonamide polymer matrices of the present invention may be formed into the composite membranes of the present invention and incorporated into filtration, separation, concentration apparatuses as well as medical devices, blood treatment devices and the like. These devices are also useful for water purification, for desalination, for industrial waste treatment, for minerals recovery such as from the mining industry, and for recovery of application solids from industrial processing. Further uses include layers or coatings upon the surface of any substrate including but not limited to a porous bead, a chromatographic material, a metal surfaces, a microdevice, a medical device, a catheter and the like. These coatings may act as lubricants, antibiotics, reservoirs, and/or filters for agents passed over the coated substrate. The coatings may also carry biological agents (e.g. antibodies, antibiotics, anti blood plasma coagulants, nucleotides, pharmaceuticals, and the like. The matrix may also be used to encapsulate and also to allow controlled release of pharmaceutical agents, diagnostic agents, cosmetics, and the like.

The composite membranes of the present invention can be used in any configuration or arrangement to achieve separation of solute from solvent. These configurations include partition, absolute filtration, chromatography, exchange and pass through concentration as well as other configurations known in the art. Although dead end filtration and chromatography configurations can be used with the composite membranes of the present invention, cross-flow filtration is preferred. Dead-end configurations call for passage of all solvent through the composite membrane and retention of solute at the filtration side of the composite membranes. The buildup of solute at the membrane surface may cause caking. In these configurations, the filtration apparatus must be periodically back flushed in order to remove cake solids or the filter discarded. Cross-flow configurations involve partial pass through of the feed liquid such that rejected solute is continually flushed away from the filtering membrane surface and passed with the retentate.

The polysulfonamide membranes of the present invention may be used as single sheets, multiple sheet units and may be formed in spiral wound configurations or as tubular membranes and as hollow fine fibers. In a typical configuration of a filtration apparatus containing a polysulfonamide membrane of the invention, an inert net material is sandwiched between two sheets of the membrane and the sandwich unit is attached to a hollow core. The sandwich sheets are sealed at the edges so that the net is sealed within the sandwich. The sandwich is then wound around the hollow core with a spacer material to provide an apparatus of the desired dimension. Liquid to be filtered is delivered under pressure to one end of the cylinder and the retentate passes out the opposite end of the cylinder. The permeate passes through the membranes and follows the path of the net to the hollow core where it separately exits from the cylinder as purified permeate.

Procedures, Examples and Tests

The following illustrative Procedures, Examples and Tests further illustrate the invention but are not meant to provide any limitation thereof. Unless otherwise stated, all percentages are weight percentages.

Procedures

Mass Per Unit Area

A section of membrane made according to the invention having the dimensions of approximately 0.95 m by 0.60 m was removed of its backing material, and cut into approximate 1.25 cm square pieces. The membrane pieces were then placed in a cellulose thimble and loaded into a soxhlet device equipped with a condensation tube. Dimethyl formamide (DMF) was refluxed for a period of 2 days, thereby dissolving the polyethersulfone (PES) support membrane and removing it from the thimble while not affecting the polysulfonamide material. The thimble was then drained of excess DMF, and methyl alcohol (MeOH) was added. If any solids such as the support material precipitated on addition of the MeOH, the MeOH was removed and the DMF extraction was allowed to continue for an additional day. When no precipitation was observed upon addition of the MeOH, the thimble was extracted with MeOH for four hours using the same soxhlet device. The thimble was then removed and dried in a convection oven at 100° C. for a minimum of 15 minutes or until no MeOH odor was noticed. The extracted thin film (the matrix of the invention) was removed from the thimble and weighed using an analytical balance. The weight divided by the original area provided the mass per unit area.

Density

A small amount (~5 mg) of the matrix of the present invention isolated using soxhlet extraction as described above was placed in a 25 ml graduated cylinder of known weight with 10 ml of Isopar G at room temperature. Due to the density of the material relative to the density of the Isopar G, the film remained at the bottom of the cylinder. Bromoform was then added drop-wise until the material floated to the surface. At this point the density of the solution was determined through its volume and mass; this value was termed density A. Isopar G was then added to the Isopar/Bromoform solution drop-wise until the material sank to the bottom of the cylinder. The density of this liquid solution was again determined through its volume and mass; this value is termed density B. The average of density A and B is used as the density of the material. The difference of densities of A and B should be less than 10% of the average density.

Roughness (Rms) Determination

The membrane to be imaged is analyzed in a dry state by atomic force microscopy. A 25 to 100 $\mu m^2$ region of the surface is imaged in contact mode. The area imaged should be characteristic of the average surface structure, and absent of atypical surface features. The Rms surface roughness is defined as:

$$Rms = \left[\frac{1}{S}\int_0^a \int_0^b (f(x, y) - z)^2 dx dy\right]^{\frac{1}{2}}$$

where a and b are the lengths of each side of the image, S is the area of the image, f(x,y) is the height at a given point (x,y), and z is the average value of the height within the image. A standardized routine to calculate the Rms roughness is included in most commercial AFM instruments.

SEM Thickness

The membrane (coupon) was rinsed in DI water for 30 minutes, followed by a 30 minute rinse in ethanol. The coupon was allowed to dry in air for 24 hours. The coupon was cut under liquid nitrogen with a razor, then mounted on the sample stage with the cut edge up. Samples were sputter coated with a 50 angstrom Pt coating and imaged. Thickness measurements were made at locations where cracks in the thin film allowed the edge to be seen. Three such areas were averaged to provide the SEM thickness.

Defects Per Unit Area

A soluble dye that will stain the support membrane, but not the thin film, is chosen. For most polysulfonamide membranes on PES or polysulfone (PS) supports, a solution of Acid Red Dye #4 (5%) in MeOH (25%) and DI water (70%) is effective. The solution is prepared and applied to the active side of the membrane. Due to the adsorptive character of the dye, it will stain the supporting membrane made accessible by defects but not the polysulfonamide thin film. Thus, regions in the film with defects large enough to permit passage of the dye can be visually observed as red dots. The number of defects per unit area can then be determined through counting or image analysis of the red dots.

Since defects are often localized in groups as a result of poor manufacturing technique, it is important to select an area not including such groups. This selection technique will provide an assessment of the membrane's inherent number of defects.

Permeation and Retention Procedures (A and Retention Values)

The permeation and retention characteristics of the membranes of the invention may be determined using the test conditions provided hereinabove. Conditions useful for reference are also found in ASTM designation D4194–95 and D4516–85 entitled "Standard Test Methods for Operating Characteristics of Reverse Osmosis Devices" and "Standard Practice for Standardizing Reverse Osmosis Performance Data" respectively.

EXAMPLES

Example 1

Effect of Reaction Time on Membrane Performance

A sample of HW31 UF membrane (Osmonics, Inc, Minnetonka, Minn., USA) was rinsed in DI water for 30 minutes. Surface water was removed with an air knife. An aqueous amine solution [1.0% ethylene diamine (EDA), 6.6% triethylammonium camphorsulfonate (TEACSA), and 0.1% dimethylaminopyridine (DMAP); 100 g total] was poured onto the active side of the support and allowed to remain in contact for one minute. The excess was drained off and an air knife was used to meter the remaining amine. An organic solution (0.16% naphthalenetrisulfonyl chloride (NTSC), 4.34% monoglyme, in 100 ml IsoparG) was then applied to the active side and allowed to remain in contact for a given time. The excess was then drained off and the resulting material was placed in an oven at 100° C. for 6 minutes.

Three coupons were cut from each membrane and placed in membrane test cells. Coupons were tested at 225 psig for four hours and then the A-Value and the sodium chloride passage (tested on a 2000 ppm sodium chloride in DI water feed) were determined. The best single coupon from each set was used as the representative performance for that membrane. Results are shown in the following Table.

| Time (minutes) | A Value | Sodium Chloride Passage |
|---|---|---|
| 0.5 | 9.50 | 8.64 |
| 1.0 | 7.00 | 6.02 |
| 2.0 | 4.90 | 7.90 |
| 5.0 | 2.70 | 7.70 |
| 30.0 | 1.30 | 9.00 |
| 60.0 | 1.70 | 13.70 |

Example 2

Effect of Oven Drying on Membrane Performance

Membranes were prepared as described in Example 1, except after the excess organic solution was drained off, the resulting material was either evaporated with moving air (air dried) or placed in an oven (100°C.) for 6 minutes (oven dried).

Three coupons were cut from each membrane and placed in membrane test cells. Coupons were run at 225 psig for four hours and then the A-Value and the sodium chloride passage (tested on a 2000 ppm sodium chloride in DI water feed) were determined. The best single coupon from each set was used as the representative performance for that membrane. Results are shown in the following Table.

| Time | A-Value (Air Dried) | A-Value (Oven Dried) | NaCl Passage (Air Dried) | NaCl Passage (Oven Dried) |
|---|---|---|---|---|
| 0.5 | 62.4 | 9.5 | 87.2 | 8.64 |
| 1.0 | 26.3 | 7.0 | 53.2 | 6.02 |
| 2.0 | 27.6 | 4.9 | 45.5 | 7.90 |
| 5.0 | 11.4 | 2.7 | 34.2 | 7.70 |
| 30.0 | 6.2 | 1.3 | 57.4 | 9.00 |
| 60.0 | 3.5 | 1.7 | 34.8 | 13.70 |

Example 3
Effect of Membrane Thickness on Performance

Membranes were prepared as described in Example 1. Three coupons were cut from each membrane and placed in membrane test cells. Coupons were run at 225 psig for four hours and then the A-Value and the sodium chloride passage (tested on a 2000 ppm sodium chloride in DI water feed) were determined. The best single coupon from each set was used as the representative performance for that membrane. Results are shown in the following Table. The SEM thickness was measured using the general procedure described above.

| Time | A-Value | NaCl Passage | Average Thickness (nm) |
| --- | --- | --- | --- |
| 0.5 | 9.5 | 8.64 | 42.6 |
| 1.0 | 7.0 | 6.02 | 45.0 |
| 2.0 | 4.9 | 7.90 | 54.3 |
| 5.0 | 2.7 | 7.70 | 93.0 |
| 30.0 | 1.3 | 9.00 | 93.5 |
| 60.0 | 1.7 | 13.70 | 108 |

Example 4
Effect of Conditions on Roughness

A sample of HW31 UF membrane was rinsed in DI water for 30 minutes. Surface water was removed with an air knife. The desired amine solution (100 ml in DI water) was poured onto the active side of the support and allowed to remain in contact for one minute. The excess was drained off and an air knife used to meter the remaining amine. The organic solution (0.16% NTSC, 4.34% monoglyme, in VM&P naphtha) was applied to the active side and allowed to remain in contact for one minute. The excess was then drained off and the remaining solution evaporated with moving air. Samples were dried by 2 day ambient evaporation.

| Amine solution 1 | Amine solution 2 | Amine solution 3 |
| --- | --- | --- |
| 1% EDA | 1% EDA<br>0.1% DMAP | 1% EDA<br>0.1% DMAP<br>6.6% TEACSA |

Roughness Results

| Amine Solution | Roughness Rms (nm) |
| --- | --- |
| 1 | 52.37 |
| 2 | 26.6 |
| 3 | 3.25 |

Example 5
Membrane Made Without Heat

An aqueous solution of ethylenediamine (1.0% by weight) and N,N-dimethylaminopyridine (0.1% by weight) was poured onto the upper surface of a PES support membrane (Osmonics HW31). This solution was allowed to remain in contact with the support for 30 seconds, after which time, the excess fluid was drained and metered with an airknife. An organic solution comprising 1,3,6-naphthalenetrisulfonyl chloride (0.16% by weight) and monoglyme (4.3% by weight) in IsoparG was then poured on top of the metered aqueous solution. This organic solution and the aqueous solution were allowed to remain in contact with each other for 30 seconds before the excess organic solution was drained and evaporated with an airknife. Following this, the membrane was allowed to stand for 30 minutes to evaporate any remaining organic solution.

The membrane was tested on a variety of salt feeds (2000 ppm) to determine performance. The following table shows performance data for the membrane made in example 5 on $MgSO_4$, $Na_2SO_4$ and $MgCl_2$ feed solutions.

| 2000 ppm salt feed | Example 5 Membrane Performance | |
| --- | --- | --- |
|  | A val | % salt passage |
| $MgSO_4$ | 9.0 | 4.7 |
| $Na_2SO_4$ | 13.5 | 2.4 |
| $MgCl_2$ | 13.1 | 62.8 |

Example 6
Membrane Prepared on a Coater

A roll of water wet support membrane (Osmonics HW31) was continuously passed through an aqueous solution containing 60% technical grade triethylenetetraamine (1.0% TETA by weight), triethylammonium camphorsulfonate (6.6% by weight) and N,N-dimethylaminopyridine (0.1% by weight) and metered with an air knife. The active side of the web intermediate (side with aqueous solution coating) was then contacted with an organic solution of 1,3,6-naphthalenetrisulfonyl chloride (0.16% by weight) and monoglyme (4.3% by weight) in IsoparG. The membrane was then passed through a 120° C. convection oven for a 2–6 minute time period.

The membrane was tested on a variety of salt feeds (2000 ppm) to determine performance. The following table shows performance data for the membrane made in example 6 on $MgSO_4$, $Na_2SO_4$ and $MgCl_2$ feed solutions:

| 2000 ppm salt feed | Example 6 Membrane Performance | |
| --- | --- | --- |
|  | A val | % salt passage |
| NaCl | 4.5 | 78.8 |
| $MgSO_4$ | 5.3 | 2.1 |
| $Na_2SO_4$ | 5.6 | 5.0 |

Example 7
Membrane Made With Heat

An aqueous solution of ethylene diamine (1.0% by weight), N,N-dimethylaminopyridine (0.1% by weight) and triethylammonium camphorsulfonate was poured onto the upper surface of a PES support membrane (Osmonics HW31). This solution was allowed to remain in contact with the support for 1 min, after which time, the excess fluid was drained and metered with an airknife. An organic solution comprising 1,3,5-benzenetrisulfonyl chloride (0.16% by weight) and monoglyme (4.3% by weight) in IsoparG was then poured on top of the metered aqueous solution. The organic solution and the aqueous solution were allowed to remain in contact with each other for 1 minute before the excess organic solution was drained and metered with an airknife. Following this, the membrane was dried in a 100° C. oven for 6minutes.

The membrane was then tested on a NaCl feed solution (2000 ppm).

Example 8
Membrane Made with Heat

A membrane was prepared and tested according to example 7 with the following changes. The organic solution was 1,3,6-naphthalenetrisulfonyl chloride (0.16 by weight) and monoglyme (4.3% by weight) in IsoparG. The following table shows performance data for the membranes made in Example 7 and Example 8:

|  | Membrane Performance | |
| --- | --- | --- |
|  | A val | % NaCl passage |
| Example 7 (0.16% BTSC) | 3.2 | 1.0 |
| Example 9 (0.16% NTSC) | 7.7 | 1.5 |

Example 9
Membrane Made On A Coater

A membrane was prepared according to Example 6 with the following exceptions. The aqueous phase consisted of ethylene diamine (1.0% by weight), triethylammonium camphorsulfonate (6.6% by weight), N,N-dimethylaminopyridine (0.1% by weight), isopropyl alcohol (20% by weight) and sodium carbonate (0.2% by weight).

The membrane was tested on a NaCl salt feed (2000 ppm) to determine performance.

Example 10
Membrane Made on a Coater

A membrane was prepared and tested according to example 9 with the following exceptions. The aqueous phase consisted of ethylene diamine (1.0% by weight), triethylammonium camphorsulfonate (6.6% by weight) and N,N-dimethylaminopyridine (0.1% by weight). The organic solution was comprised of 1,3,5-benzenetrisulfonyl chloride (0.14% by weight) and monoglyme (4.3% by weight) in IsoparG.

The following table shows performance data for membrane made in examples 9 and 10.

|  | Membrane Performance | |
| --- | --- | --- |
|  | A val | % NaCl passage |
| Example 9 | 11.1 | 8.7 |
| Example 10 | 14.7 | 31.1 |

Example 11
Membrane Made With Drying Agent

An aqueous solution of ethylene diamine (1.0% by weight), N,N-dimethylaminopyridine (0.1% by weight) and triethylamine camphorsulfonate (6.6% by weight) was poured onto the upper surface of a PES support membrane (Osmonics HW31). This solution was allowed to remain in contact with the support for 1 minute, after which time, the excess fluid was drained and metered with an airknife. An organic solution comprising 1,3,6-naphthalenetrisulfonyl chloride (0.16% by weight) and monoglyme (4.3% by weight) in IsoparG was then poured on top of the metered aqueous solution. This organic solution and the aqueous solution were allowed to remain in contact with each other for 1 minute before the excess organic solution was drained and evaporated with an airknife. Following this, the membrane was dried in an oven for 6 minutes at 100 deg C.

The membrane was tested on a NaCl feed (2000 ppm) to determine performance.

Example 12
Membrane with Drying Agent and Amine Post Treatment to Increase Membrane Flux Membrane was prepared according to Example 11 with the following changes. After airknife evaporation of the organic, a solution of diethanolamine (10% by weight) in methanol was poured onto the membrane surface. This was allowed to contact the membrane for 30 seconds, after which time the excess fluid was drained. The membrane was then dried and tested as outlined in Example 11.

The following table shows performance results from membrane made in examples 11 and 12:

|  | Membrane Performance | |
| --- | --- | --- |
|  | A val | % NaCl Pass |
| Example 11 (control) | 4.9 | 5.3 |
| Example 12 (amine post treatment) | 17.4 | 49.6 |

Example 13
Membrane with Drying Agent

Membrane was prepared and tested according to Example 11 with the following changes. The support membrane used was a PS ultrafiltration membrane (20% binary w/DMF cast 2 mil thick on a polyester backing, at 30 fpm into 18.5C DI water) with an A val of 100 and MWCO of 11K (90% dextran retention). The amine phase was an aqueous solution of ethylene diamine (3.0%), N,N-dimethylaminopyridine (0.1% by weight) and triethylamine camphorsulfonate (6.6% by weight). The organic solution was allowed to remain in contact with the aqueous solution for 2 minutes. After pouring off the organic phase, the membrane was placed into an oven and dried for 6 minutes at 100 deg C.

Example 14
Membrane with Drying Agent and Alcohol

Membrane was prepared and tested according to Example 13 with the following changes. The amine phase was an aqueous solution of ethylene diamine (3.0%), N,N-dimethylaminopyridine (0.1% by weight), triethylamine camphorsulfonate (6.6% by weight) and isopropyl alcohol (10% by weight).

Example 15
Membrane with Drying Agent and Alcohol

Membrane was prepared and tested according to Example 13 with the following changes. The amine phase was an aqueous solution of ethylene diamine (3.0%), N,N-dimethylaminopyridine (0.1% by weight), triethylamine camphorsulfonate (6.6% by weight) and isopropyl alcohol (20% by weight).

The following table shows performance results for membranes made in examples 13, 14, and 15:

|  | Membrane Performance | |
| --- | --- | --- |
|  | A val | % NaCl Pass |
| Example 13 (Control) | 4.7 | 9.8 |
| Example 14 (10% IPA) | 7.4 | 11.7 |
| Example 15 (20% IPA) | 9.0 | 11.9 |

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A sulfonamide polymer matrix having an average thickness of from about 5 nm to about 100 nm, wherein the polymer matrix is composed of sulfonyl compound residues having at least two sulfonyl moieties and amine compound residues having at least two amine moieties.

2. The polymer matrix of claim 1 wherein the amine compound residue is not polyethylenimine having a molecular weight of greater than or equal to 600 daltons.

3. The polymer matrix according to claim 1, having a thickness of from about 15 nm to about 100 nm.

4. The polymer matrix according to claim 1, having a mass/area ratio of from about 20 mg/m² to about 200 mg/m².

5. The polymer matrix according to claim 1, having a mass/area ratio of from about 50 mg/m² to about 150 mg/m².

6. The polymer matrix according to claim 1, having no more than 5 percent of the matrix volume as defects.

7. The polymer matrix according to claim 1, which comprises sulfonyl compound residues derived from a sulfonyl compound of formula I:

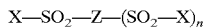

$$X-SO_2-Z-(SO_2-X)_n \qquad \text{I}$$

wherein each X is a leaving group, Z is an organic nucleus comprising 1 to about 30 carbon atoms, and n is an integer from 1 to 5.

8. The polymer matrix according to claim 7 wherein the organic nucleus contains one or more heteroatoms.

9. The polymer matrix according to claim 7 wherein Z is $C_1$–$C_{18}$alkyl, $C_2$–$C_{18}$alkenyl $C_3$–$C_7$cycloalkyl, $C_4$–$C_{16}$alkylcycloalkyl, $C_3$–$C_7$cycloalkenyl, $C_4$–$C_{16}$alkylcycloalkenyl, $C_6$–$C_{14}$aryl, $C_6$–$C_{10}$aryl-$C_1$–$C_8$alkyl, or $(C_6$–$C_{10})$ aryl-$C_1$–$C_8$alkyl-$(C_6$–$C_{10})$aryl.

10. The polymer matrix according to claim 1, which comprises amine compound residues derived from a compound of formula II:

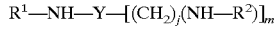

$$R^1-NH-Y-[(CH_2)_j(NH-R^2)]_m \qquad \text{II}$$

wherein Y is an organic nucleus; each $R^1$ and $R^2$ is independently hydrogen, an aliphatic group, or an aromatic group; m is 1, 2, or 3; and j is zero or an integer from 1 to about 10.

11. The polymer matrix according to claim 10, wherein Y is $C_1$–$C_{18}$alkyl, $C_2$–$C_{18}$alkenyl, $C_3$–$C_7$cycloalkyl, $C_4$–$C_{16}$alkylcycloalkyl, $C_3$–$C_7$cycloalkenyl, $C_4$–$C_{16}$alkylcycloalkenyl, $C_6$–$C_{10}$aryl, $C_6$–$C_{10}$aryl-$C_1$–$C_8$alkyl, $(C_6$–$C_{10})$aryl-$C_1$–$C_8$alkyl-$(C_6$–$C_{10})$aryl, $C_1$–$C_{18}$—NHR$^3C_1$–$C_{18}$ alkyl, or $C_1$-$C_{18}$—NHR$^3$; and $R^3$ is hydrogen, $C_1$–$C_8$alkoxy, $C_1$–$C_{18}$alkyl, $C_2$–$C_{18}$alkenyl, $C_3$–$C_8$cycloalkyl, $C_3$–$C_8$cyclo-alkenyl, $C_4$–$C_{20}$alkylcycloalkyl, $C_4$–$C_{20}$alkylcycloalkenyl, $C_6$–$C_{10}$aryl, or $C_6$–$C_{10}$aryl-$C_1$–$C_8$ alkyl.

12. The polymer matrix according to claim 1, which comprises sulfonyl compound residues derived from a sulfonyl compound having at least two activated sulfonyl groups and an organic nucleus, and which comprises amine compound residues derived from an amine compound having at least two primary and/or secondary amine groups and an organic nucleus.

13. The polymer matrix according to claim 12 wherein the sulfonyl compound residues are selected from the group consisting of benzene disulfonyl residue, benzene trisulfonyl residue, naphthalene disulfonyl residue, naphthalene trisulfonyl residue, anthacenyl disulfonyl residue, anthracenyl trisulfonyl residue, pyridine disulfonyl residue and any combination thereof.

14. The polymer matrix according to claim 12 wherein the amine compound residues are selected form the group consisting of ethylenediamine residue, diethylene triamine residue, tris-(2-aminoethyl)methane residue, tris-(2-aminoethyl)amine, 1,3-propanediamine, butanediamine, pentanediamine, hexanediamine, triethylenetetramine, (aminoalkyl)$_{1-4}$aryl residue, meta-xylene diamine, and 2-hydroxy-1,3-diaminopropane, and any combination thereof.

15. A combination comprising a sulfonamide polymer matrix according to claim 1 coated on a support material.

16. A composite membrane comprising a sulfonamide polymer matrix according to claim 1 on a porous support material.

17. The membrane of claim 16 wherein the porous support material has a molecular weight cut-off as measured by the ASTM method at 90% dextran rejection of less than 30,000 Daltons.

18. The membrane of claim 16 which has an A value greater than or equal to 2, and a sodium chloride retention value of greater than about 85%.

19. The membrane of claim 16 having an A value of at least 7 and at least 98.5% NaCl retention.

20. The membrane of claim 16 having an rms roughness less than 10.

21. The polymer matrix of claim 1 which has been subjected to post-formation treatment with a chlorinating agent, an amine, a methylating agent, or an oxidizing agent.

22. The membrane of claim 16 which has been subjected to post-formation treatment with a chlorinating agent, an amine, a methylating agent, or an oxidizing agent.

* * * * *